United States Patent
Yaqub

(10) Patent No.: US 10,657,535 B1
(45) Date of Patent: May 19, 2020

(54) SECURE CARD NOT PRESENT TRANSACTIONS USING CHIP-ENABLED CARDS

(71) Applicant: Wells Fargo Bank, N.A., San Francisco, CA (US)

(72) Inventor: Raziq Yaqub, Stewartsville, NJ (US)

(73) Assignee: Wells Fargo Bank, N.A., San Francisco, CA (US)

(*) Notice: Subject to any disclaimer, the term of this patent is extended or adjusted under 35 U.S.C. 154(b) by 220 days.

(21) Appl. No.: 15/861,285

(22) Filed: Jan. 3, 2018

Related U.S. Application Data

(60) Provisional application No. 62/594,888, filed on Dec. 5, 2017.

(51) Int. Cl.

| | | |
|---|---|---|
| *G06Q 30/00* | (2012.01) | |
| *G06Q 20/40* | (2012.01) | |
| *G06Q 20/34* | (2012.01) | |
| *G07F 7/10* | (2006.01) | |
| *G06Q 30/06* | (2012.01) | |
| *G07F 7/08* | (2006.01) | |

(52) U.S. Cl.
CPC ......... *G06Q 20/409* (2013.01); *G06Q 20/341* (2013.01); *G06Q 20/4014* (2013.01); *G06Q 30/0609* (2013.01); *G07F 7/0826* (2013.01); *G07F 7/10* (2013.01)

(58) Field of Classification Search
None
See application file for complete search history.

(56) References Cited

U.S. PATENT DOCUMENTS 6,512,482 B1  1/2003  Nelson et al.
7,954,722 B2  6/2011  Sakama
(Continued)

FOREIGN PATENT DOCUMENTS

KR  20040025318 A  3/2004
KR  10-1003827 A  4/2010
(Continued)

OTHER PUBLICATIONS

Khedekar., "'On' and 'Off' switch design to avoid credit card RFID and NFC theft," accessed from http://www.firstpost.com/tech/news-analysis/on-and-off-switch-design-to-avoid-credit-card-rfid-and-nfc-theft-3594761.html, Feb. 20, 2012, 2 pp.
(Continued)

*Primary Examiner* — Mila Airapetian
(74) *Attorney, Agent, or Firm* — Shumaker & Sieffert P.A.

(57) ABSTRACT

Techniques are described for performing secure card not present (CNP) transactions using integrated circuit chip-enabled cards. The techniques include continually or periodically tracking a location of a user's card by a user computing device, e.g., a "smart" phone, and storing a log of datasets relating to the location of the user's card at a server device. Based on the tracking, the user computing device may alert the user via a push notification or other message when the user's card is not within a preset range of the user computing device. In addition, an authentication server determines a location of a purchaser computing device attempting to perform a CNP transaction using the user's card information, and compares the location of the purchaser computing device with a most recent location of the user's card retrieved from the log of datasets to determine whether to approve the CNP transaction.

14 Claims, 7 Drawing Sheets

(56) References Cited

U.S. PATENT DOCUMENTS

| | | | |
|---|---|---|---|
| 8,322,624 | B2 | 12/2012 | Finn |
| 8,886,119 | B2 | 11/2014 | Posch et al. |
| 8,937,531 | B2 | 1/2015 | Rimai et al. |
| 9,183,487 | B2 | 11/2015 | Aiyer et al. |
| 9,292,875 | B1 | 3/2016 | Candelore et al. |
| 9,622,555 | B2 | 4/2017 | Kopel et al. |
| 9,626,673 | B2 | 4/2017 | He et al. |
| 9,697,539 | B2 | 7/2017 | Emigh et al. |
| 2008/0035725 | A1 | 2/2008 | Jambunathan et al. |
| 2009/0222891 | A1* | 9/2009 | Heffez ............ H04L 63/08 726/3 |
| 2012/0286928 | A1 | 11/2012 | Mullen et al. |
| 2013/0225079 | A1 | 8/2013 | Ashour et al. |
| 2013/0290119 | A1* | 10/2013 | Howe ............ G06Q 20/20 705/16 |
| 2014/0070010 | A1 | 3/2014 | Diorio et al. |
| 2014/0214674 | A1 | 7/2014 | Narula |
| 2015/0069132 | A1 | 3/2015 | Pueschner et al. |
| 2015/0310434 | A1* | 10/2015 | Cheung ............ G06Q 20/12 705/44 |
| 2016/0050202 | A1 | 2/2016 | Swallow |
| 2016/0224975 | A1 | 8/2016 | Na et al. |

FOREIGN PATENT DOCUMENTS

| | | |
|---|---|---|
| TW | 201104580 A | 2/2011 |
| WO | 2012019239 A1 | 2/2012 |
| WO | 2016157037 A1 | 10/2016 |

OTHER PUBLICATIONS

Roland et al., "Evaluation of Contactless Smartcard Antennas," Technical Report, University of Applied Sciences, Jun. 11, 2015, 29 pp.

Wells Fargo, "University of Florida gator 1 Card," accessed from https://www.wellsfargo.com/debit-card/campus-card/fiu/ on Jun. 2017, 2 pp.

Noyes., "RFID Credit Cards are Easy Prey for Hackers, Demo Shows," Security Alert, accessed from https://www.pcworld.com/article/249138/rfid_credit_cards_are_easy_prey_for_hackers_demo_shows.html, Feb. 1, 2012, 3 pp.

"About RFID," Rogue Industries, accessed from https://www.rogue-industries.com/pages/walletguard-rfid-blocking on Mar. 30, 2017.

Greenberg, "Hacker's Demo Shows How Easily Credit Cards Can Be Read Through Clothes and Wallets," Fobes Online, Jan. 30, 2012, 6 pp.

NANA31, "Will a layer of aluminum foil lining a wallet protect credit cards from theft of information by RFID reader? Want to advise friends too." Posted to Angie's List online, asked Sep. 29, 2011.

"Card-Not-Present Fraud: A Primer on Trends and Transaction Authentication Processes," EMV Connection, Payments Council,Feb. 2014, 21 pp.

PYMNTS, "Card-Not-Present Fraud Picking Up in US," Security & Fraud from PYMNTS Online, accessed from https://www.pymnts.com/news/security-and-risk/2017/card-not-present-fraud-picking-up-in-us/, Jan. 18, 2017.

Aitken, "U.S. Card Fraud Losses Could Exceed $12B by 2020," Forbes Online, Oct. 26, 2016, accessed from hittps://www.forbes.com/sites/rogeraitken/2016/10/26/us-card-fraud-losses-could-exceed-12bn-by-2020/#579b45c4d243, 2 pp.

IP Tracker, "IP Locator also known as IP Lookup Tool," accessed from http://www.ip-tracker.org/locator/ip-lookup.php, 3 pp.

U.S. Appl. No. 15/860,456, filed Jan. 3, 2018, naming inventor Reziq Yaqub.

Youtube, "Simple RFID hack—Digial Pocket Picking," WTVOX Fashion Innovation Magazine, https://www.youtube.com/watch?v=SPiyftJZ9jo&t=87s, posted Aug. 4, 2015.

U.S. Appl. No. 15/860,477, filed Jan. 2, 2018, naming inventor Reziq Yaqub.

\* cited by examiner

SECURE CARD NOT PRESENT TRANSACTIONS USING CHIP-ENABLED CARDS

This application claims the benefit of U.S. Provisional Application Ser. No. 62/594,888, filed on Dec. 5, 2017, the entire content of which is incorporated herein by reference.

TECHNICAL FIELD

The present disclosure relates to integrated circuit chip-enabled cards and, more particularly, communication with integrated circuit chip cards.

BACKGROUND

Users may be able to perform various transactions, such as, purchasing goods or services, online using a computing device, e.g., without being physically present in a specific place of business. In some examples, the user is not required to have a physical mode of payment to perform such transactions. For example, the user may be able to enter information associated with an account, such as a credit card account, a debit card account, a bank account, or the like as a form of payment. In this way, the user may not need to have a physical credit card, debit card, check, or the like present in order to complete the online transaction. In some examples, such transactions are referred to as card not present (CNP) transactions.

SUMMARY

In general, this disclosure describes techniques for performing secure card not present (CNP) transactions using integrated circuit chip-enabled credit or debit cards (hereinafter "cards"). The techniques include continually or periodically tracking a location of a user's card by a user computing device, e.g., a "smart" phone, and storing a log of datasets relating to the location of the user's card at a server device. According to the techniques, based on the tracking, the user computing device may alert the user via a push notification or other message when the user's card is not within a preset range of the user computing device. In addition, according to the techniques, an authentication server determines a location of a purchaser computing device attempting to perform a CNP transaction using the user's card information, and compares the location of the purchaser computing device with a most recent location of the user's card retrieved from the log of datasets to determine whether to approve the CNP transaction.

In some examples, a server device includes a memory configured to store a plurality of datasets and one or more processors in communication with the memory. The one or more processors may be configured to receive, from a purchaser computing device, a transaction approval request for a card not present transaction. The transaction approval request may include account information of a chip-enabled card used for the transaction, an amount of the transaction, and an Internet Protocol (IP) address of the purchaser computing device. The one or more processors may be further configured to determine, based on the account information of the chip-enabled card and the amount of the transaction, that there are sufficient funds for the transaction; determine, based on the IP address of the purchaser computing device, a geographical location of the purchaser computing device; retrieve, from a log, a most recent dataset associated with the chip-enabled card. The most recent dataset may indicate a geographical location of the chip-enabled card. The one or more processors may compare the geographical location of the purchaser computing device and the geographical location of the chip-enabled card and approve the transaction approval request based on the comparison.

In some examples, a computer-implemented method includes receiving, by a server device and from a purchaser computing device, a transaction approval request for a card not present transaction. The transaction approval request may include account information of a chip-enabled card used for the transaction, an amount of the transaction, and an Internet Protocol (IP) address of the purchaser computing device. The computer-implemented method may further include determining, based on the account information of the chip-enabled card and the amount of the transaction, that there are sufficient funds for the transaction; determining, based on the IP address of the purchaser computing device, a geographical location of the purchaser computing device; retrieving, from a log, a most recent dataset associated with the chip-enabled card, the most recent dataset indicating a geographical location of the chip-enabled card; comparing the geographical location of the purchaser computing device and the geographical location of the chip-enabled card; and approving the transaction approval request based on the comparison.

In some examples, a user computing device includes a memory configured to store data and one or more processors in communication with the memory. The one or more processors may be configured to determine a geographical location of the user computing device; send an interrogating electromagnetic signal having a preset range from the user computing device; determine that a chip-enabled card is within the preset range from the user computing device based on receipt of a response electromagnetic signal from the chip-enabled card including identifying information of the chip-enabled card; generate a dataset including a time stamp, the geographical location of the user computing device, and the identifying information of the chip-enabled card; and send the dataset to a server device associated with a card-issuing entity of the chip-enabled card.

In some examples, a computer-implemented method includes determining, by a user computing device, a geographical location of the user computing device; sending, from the user computing device, an interrogating electromagnetic signal having a preset range from the user computing device; determining, based on receipt of a response electromagnetic signal from the chip-enabled card including identifying information of the chip-enabled card, that the chip-enabled card is within the preset range from the user computing device; generating a dataset including a time stamp, the geographical location of the user computing device, and the identifying information of the chip-enabled card; and sending, from the user computing device to a server device associated with a card-issuing entity of the chip-enabled card, the dataset.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
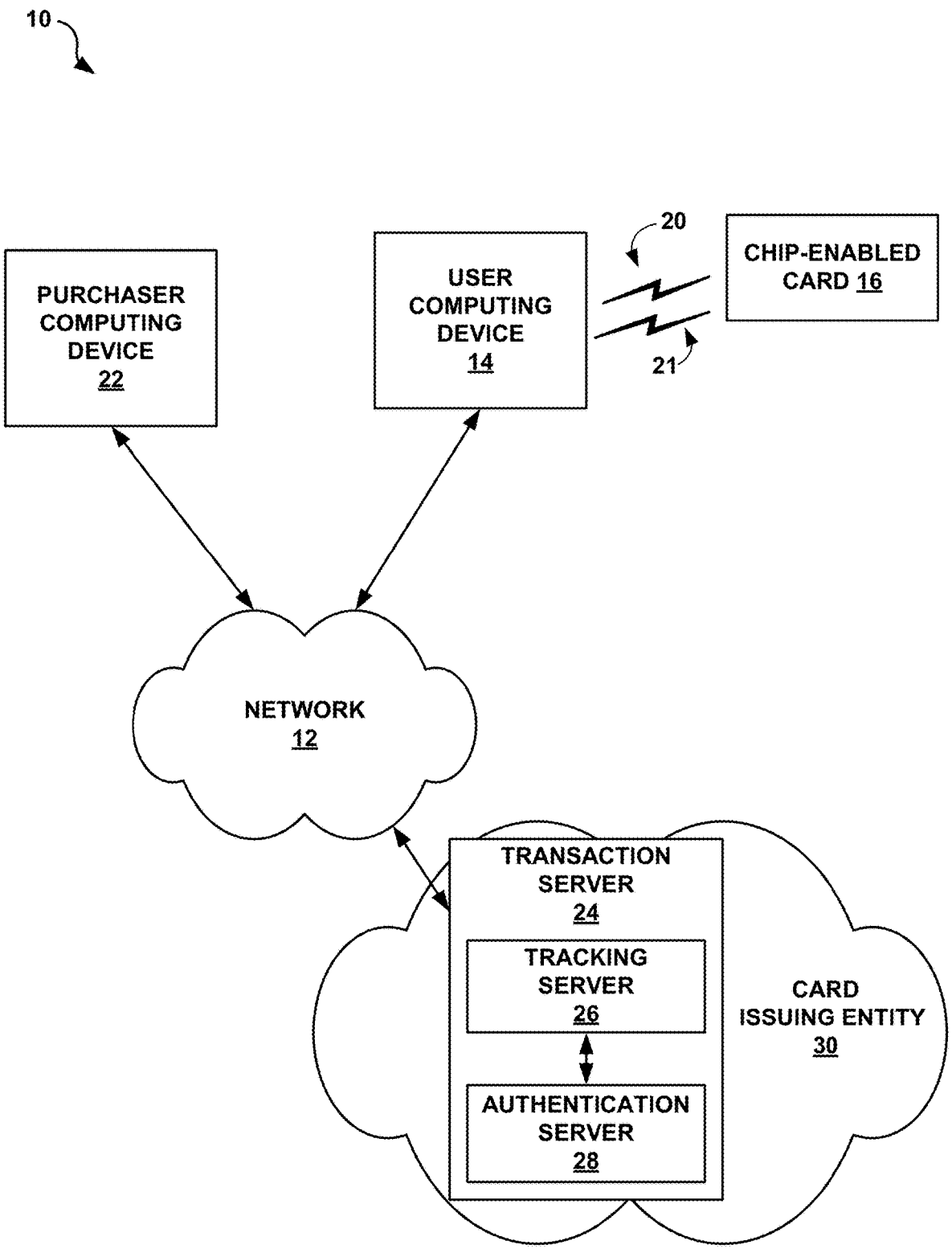
FIG. 1 is a block diagram illustrating an example secure card not present (CNP) transaction system that includes a transaction server configured to perform secure CNP transactions, in accordance with the techniques of this disclosure.

The disclosed techniques may enable performance of secure card not present (CNP) transactions. A CNP transaction allows a purchaser to purchase goods or services using a purchaser computing device without requiring a credit or debit card of the purchaser to be physically present. As an example, a purchaser may visit an online store of a goods or service provider via a website, a mobile application, or the like. The purchaser may be able to virtually browse, select items for purchase, compare prices, or search for goods or services using the online store. After the purchaser has selected items to purchase, the purchaser may be prompted to enter shipping information, payment information, and billing information. To enter the payment information, the purchaser can manually input, e.g., using a keyboard or other input device, his or her credit card, debit card, or bank account information. Additionally, or alternatively, the purchaser computing device may be configured to automatically fill in saved credit card, debit card, or bank account information, or may be configured to take a picture of the purchaser's credit card, debit card, or a check to fill in the payment information using information captured in the picture. In some examples, the purchaser does not need to have the credit card, debit card, or bank account information physically present, e.g., have a physical credit card, debit card, or check present, to complete the transaction. For example, the purchaser could have memorized or written down the credit card, debit card, or bank account information, therefore not requiring the physical credit card, debit card, or check to obtain such information to input as the payment information for the CNP transaction.

Although convenient for purchasers, CNP transactions may be especially vulnerable to fraud. For example, fraud relating to CNP transactions is expected to increase globally by about 12% by volume. Some have also predicted that fraud relating to CNP transactions will increase in the United States during the 2017 holiday season by about 43% as compared to the previous holiday season. Overall, the United States could be subject to greater than $12 billion in losses due to fraudulent card activities, such as fraudulent CNP transactions, by the year 2020. As one example, a fraudulent CNP transaction may occur when a bad actor obtains a user's account information, such as a user's credit or debit card (hereinafter, "card") account information, and enabling the bad actor to complete a CNP transaction without physically having the user's card. In some such examples, the user may still have possession of the card, and therefore may not realize that the bad actor has obtained the card account information. In turn, the user may not take precautions to prevent transactions using the card, may not check to see if fraudulent charges have occurred, or the like, all while the bad actor may be able to continue fraudulently using the card account information.

In some examples, a user may be subject to identity theft if the user misplaces or loses a card. With identify theft, a bad actor may use the user's personal information, financial or otherwise, to assume the user's identity. This may enable the bad actor to open new financial accounts, apply for a job, use the user's health insurance, or the like. In some examples, identity theft can result in adverse effects on the user's credit score, personal finances, work life, or personal life. In some examples, a user may lose or misplace a card without realizing that the card is missing right away, or even at all. In some such examples, a bad actor may be able to steal the user's identity before the user realizes the card is lost or misplaced, which in turn may result in the user not being able to protect against identity theft in time to prevent the bad actor from assuming the user's identity. In 2016, about 15.4 million consumers experienced some form of identity theft.

The disclosed techniques alert a user if their card is stolen or misplaced, and, even if the user still has their card, the disclosed techniques may prevent a bad actor from using the card account information for CNP transactions. According the techniques of the present disclosure, a user computing device is configured to track a geographical location of a chip-enabled card, and send datasets including a time stamp, a geographical location of the user computing device, and, in some examples, identifying information of the chip-enabled card, to a server device associated with a card-issuing entity. The disclosed techniques include sending an alert to the user via the user computing device if the chip-enabled card cannot be located.

In addition, according to the disclosed techniques, the server device associated with the card-issuing entity is configured to approve or deny a CNP transaction by comparing a geographical location of the chip-enabled card and a geographical location of a purchaser computing device that is being used to perform the CNP transaction with the account information related to the chip-enabled card. If the geographical locations are determined to be different, the server device may send a predetermined security question to the purchaser computing device to be answered by the purchaser using the purchaser computing device and attempting to perform the CNP transaction. If the locations are determined to be the same, or if the predetermined security question is answered correctly, the server device approves the CNP transaction. Otherwise, the server device denies the CNP transaction. In this way, a bad actor attempting to use the account information associated with the chip-enabled card to fraudulently perform a CNP transaction may be prevented from completing the CNP transaction.

FIG. 1 is a block diagram illustrating an example secure CNP transaction system 10 that includes a transaction server 24 configured to perform secure CNP transactions, in accordance with the techniques of this disclosure. As illustrated in FIG. 1, secure CNP transaction system 10 includes transaction server 24 associated with a card issuing entity 30 that includes a tracking server 26 and an authentication server 28. Although illustrated as separate devices in FIG. 1, in other examples the functions of tracking server 26 and authentication server 28 may be performed by a single server or other computing device. Secure CNP transaction system 10 further includes a user computing device 14, a chip-enabled card 16, and a purchaser computing device 22.

As shown in FIG. 1, transaction server 24 is in communication with user computing device 14 and purchaser computing device 22 via network 12. In some examples, network 12 may include a private network associated with a card-issuing entity 30. In other examples, network 12 may include a public network, such as the Internet. Although illustrated as a single entity, network 12 may include a combination of public and/or private networks. In some examples, network 12 may include one or more of a wide area network (WAN) (e.g., the Internet), a local area network (LAN), a virtual private network (VPN), or another wired or wireless communication network.

Purchaser computing device 22 is configured to perform CNP transactions. For example, purchaser computing device 22 may be configured to access an online store using a browser, a mobile application, or the like. Purchaser computing device 22 may include any of a wide range of user devices, including laptop or desktop computers, tablet computers, so-called "smart" phones, "smart" pads, or other personal digital appliances equipped for wired or wireless communication and capable of supporting the browser or the mobile application used to access the online store. Purchaser computing device 22 may include at least one user interface device (not shown) that enables a purchaser to interact with purchaser computing device 22. In some examples, the user interface device of purchaser computing device 22 may be configured to receive tactile, audio, or visual input. In addition to receiving input from the purchaser, the user interface device of purchaser computing device 22 may be configured to output content such as a graphical user interface (GUI) for display, e.g., on a display device associated with purchaser computing device 22.

Similar to purchaser computing device 22, user computing device 14 may include any of a wide range of user devices, including laptop or desktop computers, tablet computers, so-called "smart" phones, "smart" pads, or other personal digital appliances equipped for wired or wireless communication. User computing device 14 may include at least one user interface device (not shown) that enables a user to interact with user computing device 14. In some examples, the user interface device of user computing device 14 may be configured to receive tactile, audio, or visual input. In addition to receiving input from the user, the user interface device of user computing device 14 may be configured to output content such as a graphical user interface (GUI) for display, e.g., on a display device associated with user computing device 14. An example user computing device 14 is described in more detail with respect to FIG. 4.

User computing device 14 is configured to communicate with and track chip-enabled card 16. User computing device 14 may communicate with and track chip-enabled card 16 via a wireless signal 20. Wireless signal 20 may conform to a short-range wireless communication protocol, such as near-field communication (NFC), radio frequency identification (RFID), or Bluetooth®. In some examples, user computing device 14 is configured to send wireless signal 20 as an interrogating electromagnetic signal. The interrogating electromagnetic signal may have a preset range from user computing device 14. If chip-enabled card 16 is within the preset range, chip-enabled card 16 may send wireless signal 21 as a response electromagnetic signal including identifying information of chip-enabled card 16. In some examples, the identifying information does not include sensitive financial information relating to chip-enabled card 16, such as, for example, an account number, an expiration date, a security code, or the like associated with chip-enabled card 16. The identifying information, in some examples, may include a name, a username, a telephone number, an email address, an identification number, or the like of the owner of chip-enabled card 16.

Although the user associated with user computing device 14 is described herein as being the card owner of chip-enabled card 16, in other examples, the user associated with user computing device 14 may not be the owner of chip-enabled card 16. For example, the owner of chip-enabled card 16 may be a spouse, relative, friend, or the like of the user associated with user computing device 14.

Chip-enabled card 16 may be a credit card or a debit card that can be used to perform financial transactions. Chip-enabled card 16 includes one or more integrated circuit (IC) chips configured to store information relating to chip-enabled card 16, and one or more antennas configured to send wireless signal 21 and receive wireless signal 20. For example, the one or more antennas may be configured to receive an interrogating electromagnetic signal used to power the one or more ICs. Once powered, the one or more ICs are configured to send a response electromagnetic signal via the one or more antennas as a reply to the interrogating electromagnetic signal. In some examples, the one or more ICs may be configured to generate and send a signal 21 that includes sensitive financial information such as an account number, an expiration date, a security code, or the like associated with chip-enabled card 16. In other examples, the one or more ICs may be configured to generate and send a signal 21 that includes identifying information of chip-enabled card 16 that does not include sensitive financial information. In either example, the electromagnetic signals sent by chip-enabled card 16 may be encrypted in order to protect the sensitive financial information or the identifying information of the user. Examples of chip-enabled card 16 are described in more detail with respect to FIGS. 5A and 5B.

In some examples, chip-enabled card 16 is issued to the user by card issuing entity 30. Card issuing entity 30 may be a portion of a financial institution, e.g., a bank or a non-bank entity, capable of providing payment services in the form of credit or debit cards. Card issuing entity 30 may issue chip-enabled card 16 to the user and associate chip-enabled card 16 with one or more accounts held by the user. In the case of a traditional credit card, the account may include an amount of credit available to the user. In the case of a debit card, the account may include a checking or savings account that belongs to the user. For ease of explanation, this disclosure uses the term "card" to refer to both a traditional credit card and a debit card.

Card issuing entity 30 includes transaction server 24. Transaction server 24 is in communication with purchaser computing device 22 and user computing device 14 via network 12. Transaction server 24 includes tracking server 26 and authentication server 28. Tracking server 26 is configured to store datasets associated with user computing device 14 and chip-enabled card 16 and authentication server 28 is configured to authenticate CNP transactions occurring on purchaser computing device 22. An example of tracking server 26 is described in more detail with respect to FIG. 2, and an example of authentication server 28 is described in more detail with respect to FIG. 3. Although tracking server 26 and authentication server 28 are illustrated herein as two separate servers within transaction server 24, in other examples, tracking server 26 and authentication server 28 be a single server, or more than two servers may be used to perform the functions of tracking server 26 and authentication server 28, in accordance with the techniques of the disclosure.

Authentication server 28 of FIG. 1 may be used to receive, from purchaser computing device 22, a transaction approval request for a CNP transaction. The transaction approval request includes account information of chip-enabled card 16 used for the transaction, an amount of the transaction, and an Internet Protocol (IP) address of purchaser computing device 22. Authentication server 28 may then determine, based on the account information of chip-enabled card 16 and the amount of the transaction, that there are sufficient funds for the transaction, and determine, based on the IP address of purchaser computing device 22, a geographical location of purchaser computing device 22. Authentication server 28 retrieves, from a log, a most recent dataset associated with chip-enabled card 16, the most recent dataset indicating a geographical location of chip-enabled card 16, and compares the geographical location of purchaser computing device 22 and the geographical location of chip-enabled card 16. Authentication server 28 can approve the transaction approval request based on the comparison.

The log that authentication server 28 retrieves the most recent dataset from stored on tracking server 26. Tracking server 26 receives datasets from user computing device 14 including a time stamp and a geographical location of user computing device 14. In some examples, the dataset also includes identifying information of chip-enabled card 16. For example, user computing device 14 is configured to send an interrogating electromagnetic signal to chip-enabled card 16. If chip-enabled card 16 is within a preset range of user computing device 14, user computing device 14 receives a response electromagnetic signal from chip-enabled card 16 that indicates chip-enabled card 16 is within the preset range of user computing device 14. In other examples, user computing device 14 does not receive a response electromagnetic signal which indicates that chip-enabled card 16 is not within the preset range of user computing device. User computing device 14 may alert the user via a push notification or other message when chip-enabled card 16 is not within the preset range of user computing device 14. User computing device 14 then generates a dataset including a time stamp, the geographical location of user computing device 14, and, in some examples, the identifying information of chip-enabled card 16, and sends the dataset to tracking server 26.

The architecture of secure CNP transaction system 10 illustrated in FIG. 1 is shown for exemplary purposes only and should not be limited to this architecture. Secure CNP transaction system 10 illustrated in FIG. 1 shows a single user computing device 14 and a single purchaser computing device 22 in communication with a single transaction server 24. In other examples, secure CNP transaction system 10 may include multiple different user or purchaser computing devices in communication with transaction server 24 to track one or more chip-enabled cards and authenticate CNP transactions. In still other examples, secure CNP transaction system 10 may include additional or alternative servers to tracking server 26 and authentication server 28 associated with transaction server 24.

Figure 2:
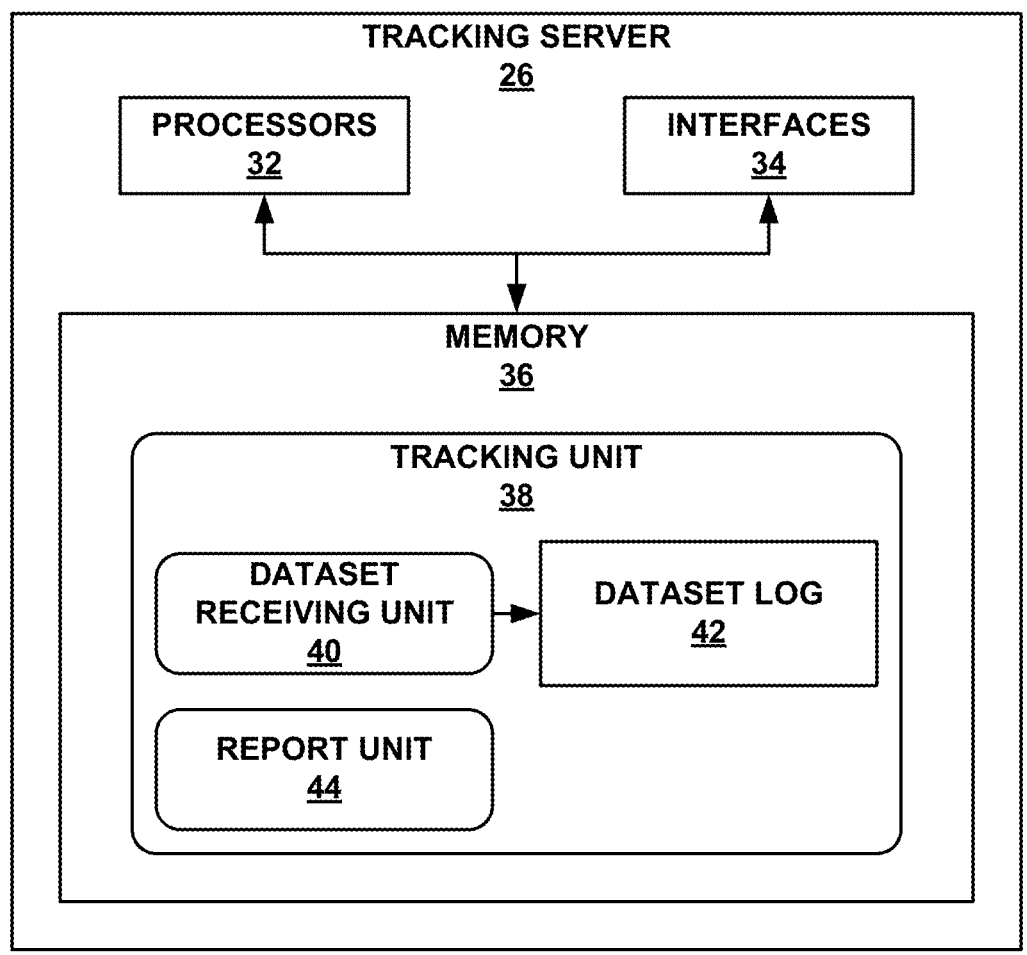
FIG. 2 is a block diagram illustrating an example tracking server configured to receive datasets relating to a user computing device and a chip-enabled card, in accordance with the techniques of this disclosure.

FIG. 2 is a block diagram illustrating an example tracking server 26 configured to receive datasets relating to a user computing device 14 and a chip-enabled card 16, in accordance with the techniques of this disclosure. The architecture of tracking server 26 illustrated in FIG. 2 is shown for exemplary purposes only and tracking server 26 should not be limited to this architecture. In other examples, tracking server 26 may be configured in a variety of ways.

As shown in the example of FIG. 2, tracking server 26 includes one or more processors 32, one or more interfaces 34, and one or more memory units 36. Memory 36 of tracking server 26 includes tracking unit 38, which is executable by processors 32. Tracking unit 38 includes dataset receiving unit 40, dataset log 42, and report unit 44. Each of the components, units, or modules of tracking server 26 are coupled (physically, communicatively, and/or operatively) using communication channels for inter-component communications. In some examples, the communication channels may include a system bus, a network connection, an inter-process communication data structure, or any other method for communicating data.

Processors 32, in one example, may include one or more processors that are configured to implement functionality and/or process instructions for execution within tracking server 26. For example, processors 32 may be capable of processing instructions stored by memory 36. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within tracking server 26 during operation. Memory 36 may include a computer-readable storage medium or computer-readable storage device. In some examples, memory 36 includes one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM), or electrically erasable and programmable memories (EEPROM). In some examples, memory 36 is used to store program instructions for execution by processors 32. Memory 36 may be used by software or applications running on tracking server 26 (e.g., dataset receiving unit 40 and report unit 44) to temporarily store information during program execution.

Tracking server 26 may utilize interfaces 34 to communicate with external devices via one or more networks, e.g., network 12 from FIG. 1, or via wireless signals. Interfaces 34 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth® radios. In some examples, tracking server 26 utilizes interfaces 34 to communicate with an external device such as user computing device 14, purchaser computing device 22, or authentication server 28.

Tracking unit 38 is configured to receive datasets from user computing device 14, log the datasets in dataset log 42, and report a lost or stolen chip-enabled card 16 to card issuing entity 30. Dataset receiving unit 40 is configured to receive the datasets associated with chip-enabled card 16 from user computing device 14. In some examples, the dataset includes a geographical location of user computing device 14, a time stamp, and identifying information of chip-enabled card 16. For example, the geographical location of user computing device 14 may be based on a Global Positioning System (GPS) built into user computing device 14, and the time stamp may be based on the time and/or date kept by user computing device 14, which may be based on GPS time. In some such examples, a dataset that includes the identifying information of chip-enabled card 16 may indicate that chip-enabled card 16 is within a preset range from user computing device 14. If chip-enabled card 16 is indicated to be within the preset range from user computing device 14, dataset receiving unit 40 may indicate that the geographical location of chip-enabled card 16 is the same as the geographical location of user computing device 14 included in the dataset. Although described herein as having the same geographical location if chip-enabled card 16 is within the preset range from user computing device 14, it should be understood that the geographical locations may not be exactly the same, e.g., chip-enabled card 16 may be up to the distance of the preset range away from the geographical location of user computing device 14.

Dataset receiving unit 40 may then store the dataset in dataset log 42 with an indication that the geographical location of chip-enabled card 16 is the geographical location of user computing device 14. In this way, the dataset stored in dataset log 42 may include the geographical location of chip-enabled card 16, the time stamp, and the identifying information of chip-enabled card 16. In some examples, the dataset stored in dataset log 42 may include the geographical location of user computing device 14 in addition to, or as an alternative to, the geographical location of chip-enabled card 16. In some examples, the dataset stored in dataset log 42 may further include an indication that the geographical location of chip-enabled card 16 is the geographical location of user computing device 14.

In other examples, the dataset includes a geographical location of user computing device 14 and a time stamp, but does not include identifying information of chip-enabled card 16. Receipt of a dataset that does not include identifying information of chip-enabled card 16 may indicate that chip-enabled card 16 is not within the preset range from user computing device 14. Dataset receiving unit 40 may store the dataset in dataset log 42 with an indication that the geographical location of user computing device 14 is not the geographical location of chip-enabled card 16, e.g., that the location of chip-enabled card 16 is unknown. In some examples in which identifying information of chip-enabled card 16 is not included in the dataset, dataset receiving unit 40 may only store the time stamp and the geographical location of user computing device 14 in dataset log 42, and may indicate in dataset log 42 that the geographical location of chip-enabled card 16 is unknown. In other examples, a dataset in dataset log 42 that does not include the identifying information of chip-enabled card 16 may alone indicate that the location of chip-enabled card is unknown, e.g., the dataset may not include a direct indication that the geographical location of chip-enabled card 16 is unknown. The latest dataset that dataset receiving unit 40 stores in dataset log 42 may be considered the most recent dataset. For example, dataset receiving unit 40 may store every dataset received, with the most recently stored (e.g., the latest or newest) dataset in dataset log 42 being the most recent dataset.

In some examples, dataset receiving unit 40 receives datasets from user computing device 14 continuously. In other examples, data receiving unit 40 receives datasets from user computing device 14 periodically. For example, data receiving unit 40 may receive datasets from user computing device 14 periodically based on a certain time interval, such as every five minutes, ten minutes, thirty minutes, or hour. In some examples, dataset receiving unit 40 may receive datasets based on the location and/or movement of user computing device 14. In some such examples, the time intervals at which dataset receiving unit 40 receives dataset may vary. In some examples, data receiving unit 40 may receive datasets continuously for a period of time, and may receive datasets periodically for another period of time, or vice versa. For example, dataset receiving unit 40 may receive datasets continuously during day time hours, and may receive datasets periodically during night time hours. Dataset receiving unit 40 may receive datasets continuously, periodically based on any time interval, at varying time intervals, or any combination thereof, and dataset receiving unit 40 should not be limited to the examples described herein.

Dataset log 42 includes a log of previously received datasets and the most recent dataset, e.g., the dataset most recently stored in dataset log 42 by dataset receiving unit 40. In this way, dataset log 42 can provide a tracking log of the geographical location of chip-enabled card 16. For example, if the most recent dataset indicates that the location of chip-enabled card 16 is unknown, dataset log 42 may include the last previously known geographical location of chip-enabled card 16, e.g., from a previously received dataset that indicated chip-enabled card 16 was within the preset range from user computing device 14. In turn, the user and/or card-issuing entity 30 may be able to access dataset log 42 to determine the last previously known geographical location of chip-enabled card 16, which, in some examples, may be the geographical location where chip-enabled card 16 is still located. For example, the user may have left chip-enabled card 16 at a restaurant, and the last previously known geographical location of chip-enabled card 16 (the restaurant, in this example) may be determined using dataset log 42 so that the user can return to the restaurant to look for chip-enabled card 16, inform the restaurant employees of the potential lost or stolen card, or the like.

Report unit 44 is configured to report a lost or stolen chip-enabled card 16 to card issuing entity 30. In some examples, report unit 44 may receive a message from user computing device 14 indicating that the user wants to contact card-issuing entity 30. If report unit 44 receives the message indication that the user wants to contact card-issuing entity 30, report unit 44 may set-up a secure communication line for the user to contact card-issuing entity 30, such as, for example, a secure voice communication channel or a secure data communication channel. In some examples, report unit 44 may receive a notification from user computing device 14 to lock or cancel chip-enabled card 16 such that it cannot be used for transactions, issue a new chip-enabled card to the user, monitor the account of the user linked to chip-enabled card 16, or the like. Report unit 44 may automatically perform the action, or may alert card-issuing entity 30 to perform the action.

Additionally, or alternatively, report unit 44 may be configured to access dataset log 42 in order to determine the most recent previously known geographical location of chip-enabled card 16. In some examples, report unit 44 may send the most recent previously known geographical location of chip-enabled card 16 to user computing device 14 such that user computing device 14 can present, e.g., via a display, the most recent previously known geographical location of chip-enabled card 16 to the user. In this way, the user may be able to use the most recent previously known geographical location of chip-enabled card 16 to look for chip-enabled card 16 at that geographical location, for example. In some examples, report unit 44 sending the most recent previously known geographical location of chip-enabled card 16 to user computing device 14 may prevent card-issuing entity 30 from locking or canceling chip-enabled card 16 such that it cannot be used for transactions and/or issuing a new chip-enabled card to the user unnecessarily, e.g., if chip-enabled card 16 was left somewhere and found by the user after report unit 44 sent the last previously known location of chip-enabled card 16 to user computing device 14.

Figure 3:
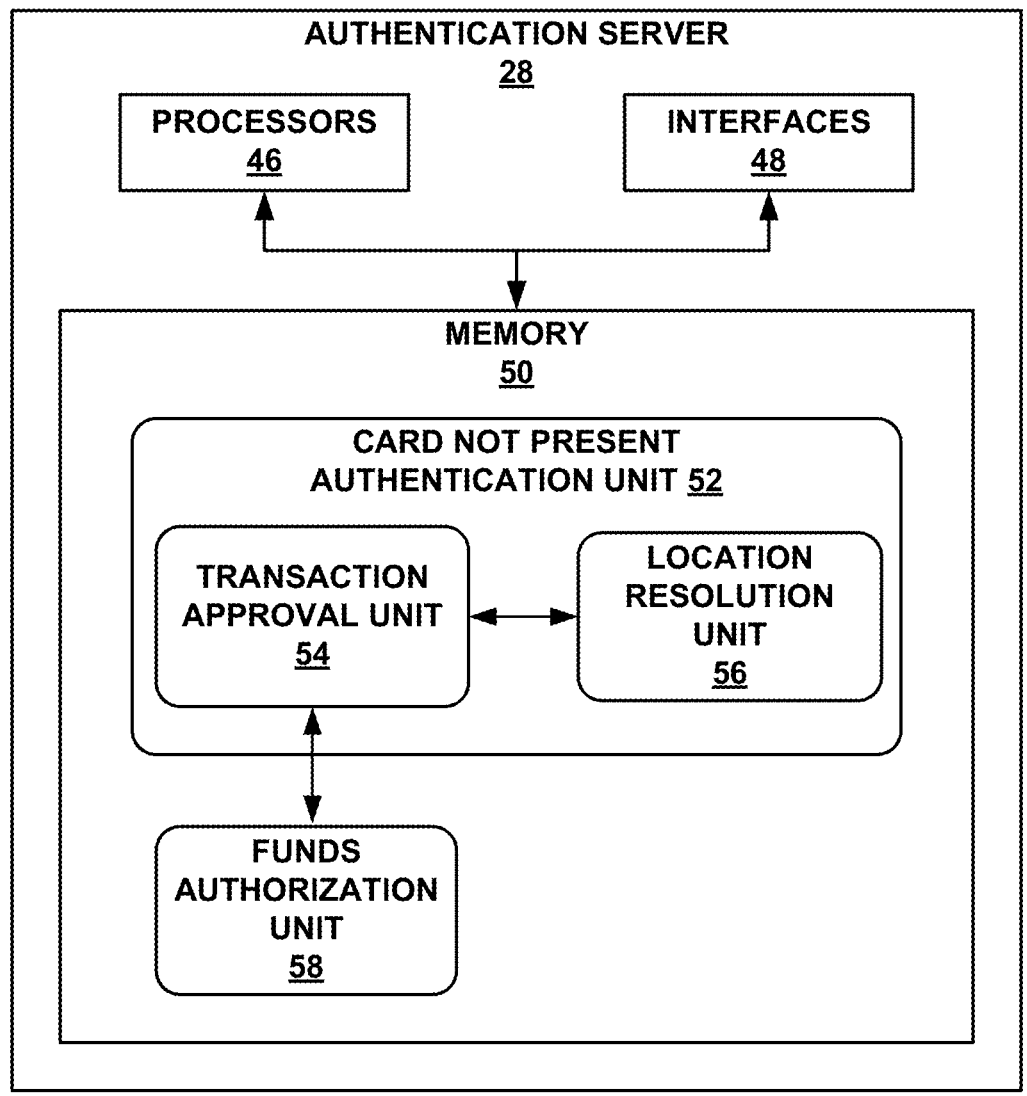
FIG. 3 is a block diagram illustrating an example authentication server configured to receive and approve CNP transaction requests from a purchaser computing device, in accordance with the techniques of this disclosure.

FIG. 3 is a block diagram illustrating an example authentication server 28 configured to receive and approve CNP transaction requests from a purchaser computing device 22, in accordance with the techniques of this disclosure. The architecture of authentication server 28 illustrated in FIG. 3 is shown for exemplary purposes only and authentication server 28 should not be limited to this architecture. In other examples, authentication server 28 may be configured in a variety of ways.

As shown in the example of FIG. 3, authentication server 28 includes one or more processors 46, one or more interfaces 48, and one or more memory units 50. Memory 50 of authentication server 28 includes card not present (CNP) authentication unit 52 and funds authorization unit 58, which are executable by processors 46. CNP authentication unit 52 includes transaction approval unit 54 and location resolution unit 56. Each of the components, units, or modules of authentication server 28 are coupled (physically, communicatively, and/or operatively) using communication channels for inter-component communications. In some examples, the communication channels may include a system bus, a network connection, an inter-process communication data structure, or any other method for communicating data.

Processors 46, in one example, may include one or more processors that are configured to implement functionality and/or process instructions for execution within authentication server 28. For example, processors 46 may be capable of processing instructions stored by memory 50. Processors 46 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 50 may be configured to store information within authentication server 28 during operation. Memory 50 may include a computer-readable storage medium or computer-readable storage device. In some examples, memory 50 includes one or more of a short-term memory or a long-term memory. Memory 50 may include, for example, random access memories (RAM), dynamic random access memories (DRAM), static random access memories (SRAM), magnetic discs, optical discs, flash memories, or forms of electrically programmable memories (EPROM), or electrically erasable and programmable memories (EEPROM). In some examples, memory 50 is used to store program instructions for execution by processors 46. Memory 50 may be used by software or applications running on authentication server 28 (e.g., CNP authentication unit 52, funds authorization unit 58, transaction approval unit 54, or location resolution unit 56) to temporarily store information during program execution.

Authentication server 28 may utilize interfaces 48 to communicate with external devices via one or more networks, e.g., network 12 from FIG. 1, or via wireless signals. Interfaces 48 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth® radios. In some examples, authentication server 28 utilizes interfaces 48 to communicate with an external device such as user computing device 14, purchaser computing device 22, or tracking server 26.

In some examples, chip-enabled card 16 may be within the preset range of user computing device 14, but a bad actor may have obtained sensitive financial information and/or account information linked to chip-enabled card 16. In this way, the bad actor may attempt to use the sensitive financial information or account information linked to chip-enabled card 16 to perform a CNP transaction without having possession of the physical chip-enabled card 16. CNP authentication unit 52 is configured to receive a transaction approval request for a CNP transaction from purchaser computing device 22, determine a geographical location of purchaser computing device 22, and approve or deny the transaction approval request based at least in part on the geographical location of purchaser computing device 22. In turn, the transaction approval request from the bad actor attempting to use the account information linked to chip-enabled card 16 on purchaser computing device 22 at a different geographical location than chip-enabled card 16 may be denied by CNP authentication unit 52 so that the bad actor is not able to perform the CNP transaction using the user's account information linked to chip-enabled card 16.

Transaction approval unit 54 receives a transaction approval request from purchaser computing device 22. The transaction approval request may include account information of a card, e.g., chip-enabled card 16, used for the CNP transaction, an amount of the CNP transaction, and an IP address of purchaser computing device 22. After receiving the transaction approval request, transaction approval unit 54 may send the account information of chip-enabled card 16 and amount of the CNP transaction from the transaction approval request to funds authorization unit 58. Funds authorization unit 58 is configured to determine if the account linked to chip-enabled card 16 has sufficient funds for the amount of the CNP transaction. For examples in which chip-enabled card 16 is a traditional credit card, funds authorization unit 58 may determine if the credit account linked to chip-enabled card 16 has a sufficient amount of credit available for the amount of the CNP transaction, e.g., an amount of credit greater than or equal to the amount of the CNP transaction. For examples in which chip-enabled card 16 is a debit card, funds authorization unit 58 may determine if a checking or savings account linked to chip-enabled card 16 has a sufficient amount of funds available for the amount of the CNP transaction, e.g., an amount of funds greater than or equal to the amount of the CNP transaction. If funds authorization unit 58 determines that the account linked to chip-enabled card 16 does not have a sufficient amount of funds, funds authorization unit 58 may notify transaction approval unit 54 that the transaction approval request should be denied.

Transaction approval unit 54 also sends the IP address of purchaser computing device 22 received in the transaction approval request to location resolution unit 56. In some cases, transaction approval unit 54 may send the IP address to location resolution unit 56 in response to funds authorization unit 58 determining that the account linked to chip-enabled card 16 does have a sufficient amount of funds. In other cases, transaction approval unit 54 may send the IP address to location resolution unit 56 for processing in parallel with funds authorization unit 58.

Location resolution unit 56 is configured to determine the geographical location of purchaser computing device 22 based on the IP address of purchaser computing device 22. In some examples, location resolution unit 56 may utilize a variety of methods to determine the geographical location of purchaser computing device 22, such as, for example, utilizing information registered in a database, geographic codes in the IP address, network routing and/or timing information, or the like. In some examples, a geolocation determination service may be used to determine the geographical location of purchaser computing device 22 based on the IP address of purchaser computing device 22. Some geolocation determination services may use a WHOIS lookup to determine the geographical location of purchaser computing device 22. Examples of geolocation determination services include, but are not limited to, IP2Location™, ininfo.io, IP-GeoLoc™ Address Geolocation Online Service, DB-IP Database, Skyhook Precision Location, and GeoIP® Databases and Services.

In some examples, the geographical location of purchaser computing device 22 determined by location resolution unit 56 may include a city, state, region, and/or country of purchaser computing device 22. Additionally, or alternatively, in some examples, location resolution unit 56 may determine an address, a latitude, a longitude, a postal code, an internet service provider, a domain, and/or an organization associated with the IP address of purchaser computing device 22.

In some examples, location resolution unit 56 may ping purchaser computing device 22 and/or a server associated with purchaser computing device 22 and determine the amount of time it takes for a signal to return to location resolution unit 56. In this way, location resolution unit 56 may be able to determine a broad area in which purchaser computing unit 22 is likely located (e.g., within several miles of purchaser computing device 22). Location resolution unit 22 may then use the broad area to determine one or more postal codes associated with the broad area. The one or more postal codes may enable location resolution unit 56 to determine one or more landmarks, such as a school or a business, within the broad area. In some examples, location resolution unit 56 may ping servers associated with the determined landmarks and determine the amount of time it takes for a signal to return to location resolution unit 56. Location resolution unit 56 may then use relative ping times from location resolution unit 56 to each landmark, from location resolution unit 56 to purchaser computing device 22 and/or a server associated with purchaser computing device 22, from each landmark to purchaser computing device 22 and/or a server associated with purchaser computing device 22, or combinations thereof to determine the location of purchaser computing device 22. In some such examples, location resolution unit 56 may be able to determine the location of purchaser computing device 22 within about 690 meters (about 2300 feet).

In some examples, multiple methods and/or services may be used in sequence or in combination to determine the geographical location of purchaser computing device 22. For example, the information obtained from multiple geolocation determination services may be compared in order to determine a geographical location of purchaser computing device 22 that is more likely to accurate. As an example, if five geolocation determination services provide information indicating that purchaser computing device 22 is located at geographical location X, and one geolocation determination service provides information indicating that purchaser computing device 22 is at geographical location Y, then location resolution unit 56 may determine that geographical location X may be more likely to be the true geographical location of purchaser computing device 22. In other examples, location resolution unit 56 may use other comparisons, metrics, or determinations to determine the geographical location of purchaser computing device 22.

Location resolution unit 56 is also configured to retrieve a most recent dataset associated with chip-enabled card 16 from dataset log 42 of tracking server 26 (FIG. 2). The most recent dataset includes a time stamp and, as described above, indicates a geographical location of chip-enabled card 16. For example, if chip-enabled card 16 was determined to be within a preset range of user computing device 14, the most recent dataset retrieved from dataset log 42 may indicate that the geographical location of chip-enabled card 16 is the geographical location of user computing device 14. As another example, if chip-enabled card 16 was determined to not be within the preset range of user computing device 14, the most recent dataset retrieved from dataset log 42 may indicate that the geographical location of chip-enabled card 16 is unknown. The most recent dataset retrieved from dataset log 42 may be the dataset most recently received by dataset receiving unit 40 and logged in dataset log 42, e.g., the dataset with a time stamp closest to the current time. In this way, location resolution unit 56 can determine the location of chip-enabled card 16 by retrieving the most recent dataset from dataset log 42 rather than alerting user computing device 14 to send an interrogating electromagnetic signal at that instant and wait to receive a new dataset from user computing device 14, which may take more time than location resolution unit 56 accessing dataset log 42 for such information.

Location resolution unit 56 compares the geographical location of purchaser computing device 22 with the geographical location of chip-enabled card 16 indicated by the most recent dataset retrieved from dataset log 42. If the geographical location of purchaser computing device 22 is the same or substantially the same as the geographical location of chip-enabled card 16, location resolution unit 56 may notify transaction approval unit 54 that the geographical locations are substantially the same. For example, location resolution unit 56 may determine if the geographical location of purchaser computing device 22 is within a predetermined threshold distance of chip-enabled card 16. The geographical location of purchaser computing device 22 being substantially the same as the geographical location of chip-enabled card 16 may indicate that it is unlikely a bad actor is attempting to perform the CNP transaction from purchaser computing device 22. When transaction approval unit 54 receives the notification indicating that the geographical location of purchaser computing device 22 is substantially the same as the geographical location of chip-enabled card 16, transaction approval unit 54 may approve the CNP transaction requested by purchaser computing device 22.

If the geographical location of purchaser computing device 22 is different than the geographical location of chip-enabled card 16, location resolution unit 56 may notify transaction approval unit 54 that the geographical locations are different, e.g., the geographical locations are a greater distance apart than a predetermined threshold distance. In some examples, the geographical location of purchaser computing device 22 being different than the geographical location of chip-enabled card 16 may indicate that a bad actor is attempting to perform the CNP transaction from purchaser computing device 22. In other examples, however, the geographical location of purchaser computing device 22 may be different than the geographical location of chip-enabled card 16, but the CNP transaction may not be fraudulent. For example, the owner of chip-enabled card 16 may give a purchaser permission to use the account information of chip-enabled card 16 to perform a CNP transaction from a different geographical location than the geographical location of chip-enabled card 16.

In order to protect against fraudulent transactions but to prevent CNP authentication unit 52 from denying a legitimate CNP transaction even though the CNP transaction is requested by purchaser computing device 22 with a different geographical location than chip-enabled card 16, transaction approval unit 54 may send a predetermined security question prompt to purchaser computing device 22 upon being notified that the geographical locations of purchaser computing device 22 and chip-enabled card 16 are different. The predetermined security question may be determined by the user during an initial setup or registration of chip-enabled card 16 and prior to use of chip-enabled card 16. For example, the user may choose or input the predetermined security question and a predetermined answer to the predetermined security question upon registration with card-issuing entity 30.

Transaction approval unit 54 may receive an answer to the predetermined security question from purchaser computing device 22 and compare the received answer to the predetermined answer to the predetermined security question. If the answer to the predetermined security question received from purchaser computing device 22 is the same as the predetermined answer to the predetermined security question, transaction approval unit 54 may approve the CNP transaction requested by purchaser computing device 22. In some examples, the received answer may have to be identical to the predetermined answer. For example, the predetermined answer may be case sensitive, and the received answer may have to match the case (e.g., lowercase or uppercase) of the characters in the predetermined answer in addition to matching the predetermined answer overall. In other examples, the answer may not have to be identical to the predetermined answer, such as, for example, if the predetermined answer is not case sensitive.

If the answer to the predetermined security question received from purchaser computing device 22 is not the same as the predetermined answer to the predetermined security question, transaction approval unit 54 may deny the CNP transaction requested by purchaser computing device 22. In some examples, transaction approval unit 54 may also send a notification to user computing device 14 that the account information of chip-enabled card 16 was used in an attempted CNP transaction in which the geographical location of purchaser computing device 22 and the geographical location of chip-enabled card 16 were different and an incorrect answer to the predetermined security question was received.

In some examples, if transaction approval unit 54 does not receive an answer to the predetermined security question from purchaser computing device 22 within a predetermined amount of time, the transaction approval request will time out and automatically be denied by transaction approval unit 54.

In some examples, the geographical location of chip-enabled card 16 may be indicated as unknown in the most recent dataset received by location resolution unit 56. In some such examples, location resolution unit 56 may notify transaction approval unit 54 that the geographical locations of purchaser computing device 22 and chip-enabled card 16 cannot be compared. In some examples, transaction approval unit 54 may send a one-time passcode (OTP) to user computing device 14 and purchaser computing device 22 may prompt the purchaser to enter the OTP using purchaser computing device 22. Purchaser computing device 22 may send the OTP to transaction approval unit 54. If the OTP entered using purchaser computing device 22 is the same as the OTP sent to user computing device 14, transaction approval unit 54 approves the transaction. If the OTP entered using purchaser computing device 22 is different than the OTP sent to user computing device 14, transaction approval unit 54 denies the transaction. As another example, transaction approval unit 54 may send the predetermined security question to purchaser computing device 22 in addition to or as an alternative to the OTP. In other examples, transaction approval unit 54 may automatically deny the transaction approval request if the geographical location of chip-enabled card 16 is indicated as unknown in the most recent dataset.

Figure 4:
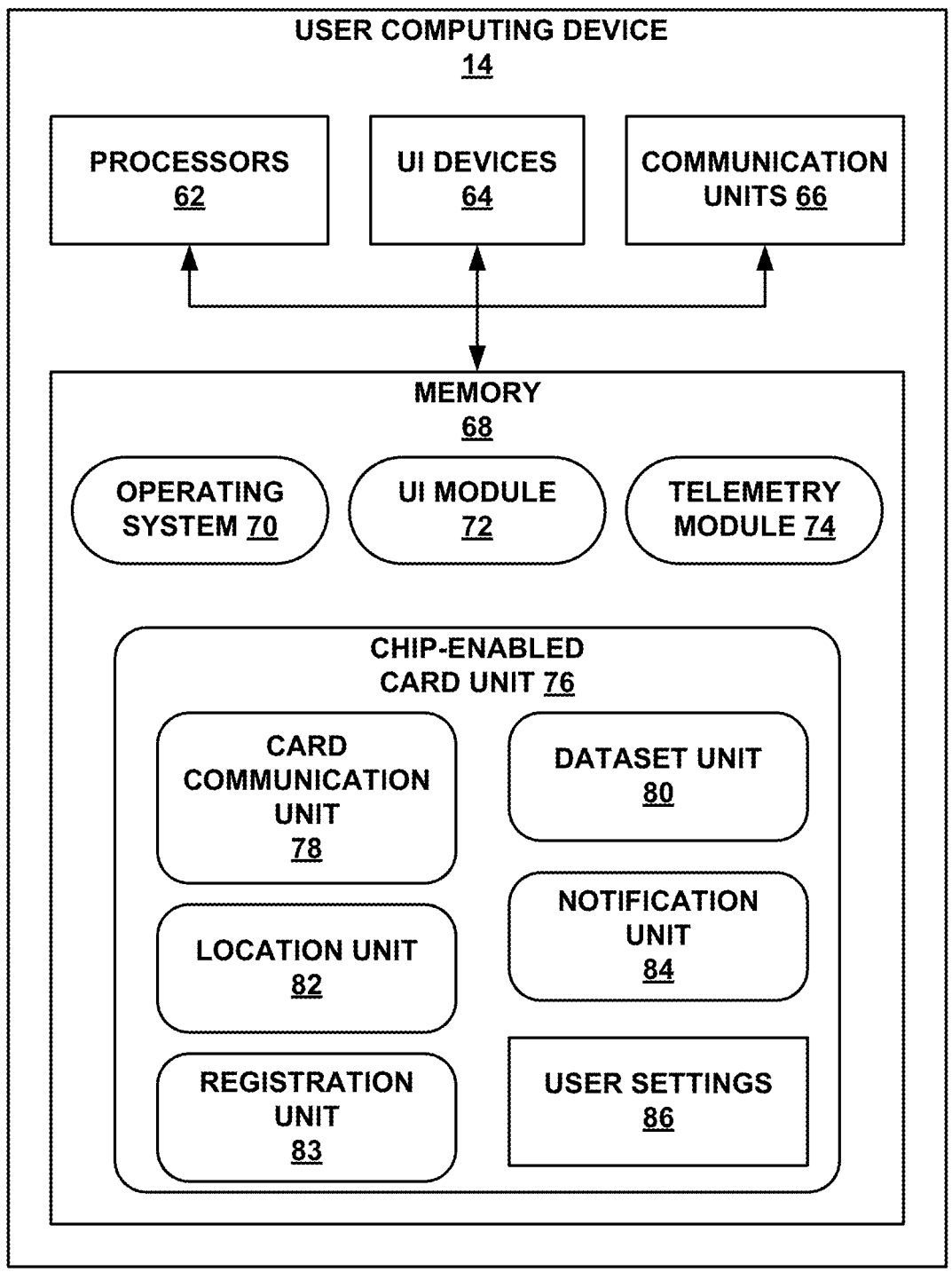
FIG. 4 is a block diagram illustrating an example user computing device configured to communicate with a chip-enabled card and create datasets, in accordance with the techniques of this disclosure.

FIG. 4 is a block diagram illustrating an example user computing device 14 configured to communicate with chip-enabled card 16 and create datasets, in accordance with the techniques of this disclosure. The architecture of user computing device 14 illustrated in FIG. 4 is shown for exemplary purposes only and user computing device 14 should not be limited to this architecture. In other examples, user computing device 14 may be configured in a variety of ways.

As shown in the example of FIG. 4, user computing device 14 includes one or more processors 62, one or more user interface (UI) devices 64, one or more communication units 66, and one or more memory units 68. Memory 68 of user computing device 14 includes operating system 70, UI module 72, telemetry module 74, and chip-enabled card unit 76, which are executable by processors 62. Each of the components, units, or modules of user computing device 14 are coupled (physically, communicatively, and/or operatively) using communication channels for inter-component communications. In some examples, the communication channels may include a system bus, a network connection, an inter-process communication data structure, or any other method for communicating data.

Processors 62, in one example, may include one or more processors that are configured to implement functionality and/or process instructions for execution within user computing device 14. For example, processors 62 may be capable of processing instructions stored by memory 68. Processors 62 may include, for example, microprocessors, DSPs, ASICs, FPGAs, or equivalent discrete or integrated logic circuitry, or a combination of any of the foregoing devices or circuitry.

Memory 68 may be configured to store information within user computing device 14 during operation. Memory 68 may include a computer-readable storage medium or computer-readable storage device. In some examples, memory 68 includes one or more of a short-term memory or a long-term memory. Memory 68 may include, for example, RAM, DRAM, SRAM, magnetic discs, optical discs, flash memories, or forms of EPROM, or EEPROM. In some examples, memory 68 is used to store program instructions for execution by processors 62. Memory 68 may be used by software or applications running on user computing device 14 (e.g., chip-enabled card unit 76) to temporarily store information during program execution.

User computing device 14 may utilize communication units 66 to communicate with external devices via one or more networks, e.g., network 12 from FIG. 1, or via wireless signals. Communication units 66 may be network interfaces, such as Ethernet interfaces, optical transceivers, RF transceivers, or any other type of devices that can send and receive information. Other examples of interfaces may include Wi-Fi, NFC, or Bluetooth® radios.

UI devices 64 may be configured to operate as both input devices and output devices. For example, UI devices 64 may be configured to receive tactile, audio, or visual input from a user of user computing device 14. In addition to receiving input from a user, UI devices 64 may be configured to provide output to a user using tactile, audio, or video stimuli. In one example, UI devices 64 may be configured to output content such as a graphical user interface (GUI) for display at a display device. UI devices 64 may include a presence-sensitive display that displays a GUI and receives input from a user using capacitive, inductive, and/or optical detection at or near the presence sensitive display.

Other examples of UI devices 64 include a mouse, a keyboard, a voice responsive system, a video camera, a microphone, or any other type of device for detecting a command from a user, a sound card, a video graphics adapter card, or any other type of device for converting a signal into an appropriate form understandable to humans or machines. Additional examples of UI devices 64 include a speaker, a cathode ray tube (CRT) monitor, a liquid crystal display (LCD), an organic light emitting diode (OLED), or any other type of device that can generate intelligible output to a user.

Operating system 70 controls the operation of components of user computing device 14. For example, operating system 70, in one example, facilitates the communication of UI module 72, telemetry module 74, and chip-enabled card unit 76 with processors 62, UI devices 64, communication units 66, and memory 68. UI module 72, telemetry module 74, and chip-enabled card unit 76 may each include program instructions and/or data stored in memory 68 that are executable by processors 62. For example, chip-enabled card unit 76 may include instructions that cause user computing device 14 to perform one or more of the techniques described herein.

UI module 72 may be software and/or hardware configured to interact with one or more UI devices 64. For example, UI module 72 may generate a GUI display to be displayed using one or more UI devices 64 or may generate audio to be transmit to a user through one or more UI devices 64. In some examples, UI module 72 may process an input after receiving it from one of UI devices 64, or UI module 72 may process an output prior to sending it to one of UI devices 64.

Telemetry module 74 may be software and/or hardware configured to interact with one or more communication units 66. Telemetry module 74 may generate and/or process data packets sent or received using communication units 66. In some examples, telemetry module 74 may process one or more data packets after receiving it from one of communication units 66. In other examples, telemetry module 74 may generate one or more data packets or process one or more data packets prior sending it via communication units 66.

User computing device 14 may include additional components that, for clarity, are not shown in FIG. 4. For example, user computing device 14 may include a battery to provide power to the components of user computing device 14. Similarly, the components of user computing device 14 shown in FIG. 4 may not be necessary in every example of user computing device 14.

In the example illustrated in FIG. 4, chip-enabled card unit 76 includes card communication unit 78, dataset unit 80, location unit 82, registration unit 83, notification unit 84, and user settings 86. Location unit 82 is configured to determine a geographical location of user computing device 14. In some examples, location unit 82 may determine the geographical location of user computing device 14 using Global Positioning System (GPS) data, Global System for Mobile communication (GSM) Cell Identification (ID) data, Wi-Fi data, data from one or more inertial sensors of user computing device 14, data from one or more barometric sensors of user computing device 14, data from RF, Bluetooth® and/or NFC signals, or the like.

In some examples, location unit 82 is additionally configured to determine movement of user computing device 14. For example, location unit 82 may monitor the geographical location of user computing device 14 continuously or periodically such that location unit 82 can determine if user computing device 14 has been moved to a different location. Additionally, or alternatively, location unit 14 may be configured to detect specific movements, such as, for example, if user computing device 14 is in a moving vehicle, or if user computing device 14 is changing location due to a walking motion. In some examples, location unit 82 may be configured to determine a distance between two subsequent geographical locations.

In some examples, a user may be able to select when or how often location unit 82 determines the geographical location of user computing device 14. For example, the user may be able to choose one or more settings in user settings 86 using user computing device 14, e.g., using UI devices 64. In some examples, the user may be able to choose a continuous location determination setting or a periodic location determination setting. If the periodic location determination setting is selected, the user may be able to choose a time interval at which the location is determined by location unit 82.

In some examples, the geographical location of user computing device 14 determined by location unit 82 or the distance between two subsequent geographical locations of user computing device 14 may be used to determine when an interrogating electromagnetic signal is sent by user computing device 14 using card communication unit 78. For example, card communication unit 78 may be configured to send an interrogating electromagnetic signal if location unit 82 determines that the distance between two subsequent geographical locations of user computing device 14 is greater than a predetermined threshold distance. In this way, card communication unit 78 may not send interrogating electromagnetic signals for minor movements of user computing device 14, which may result in user computing device 14 using less battery power than some user computing devices that send interrogating electromagnetic signals for minor movements of user computing device 14.

In some examples, the user may be able to choose when or how often card communication unit 78 sends interrogating electromagnetic signals using user settings 86. In some examples, a user may be able to choose a security level which corresponds how often card communication unit 78 sends an interrogating electromagnetic signal. For example, a user may be able to select a more sensitive security level using user settings 86 which may correspond to card communication unit 78 sending an interrogating electromagnetic signal when location unit 82 determines a relatively small distance between two subsequent geographical locations, or a user may be able to select a less sensitive security level using user settings 86 which may correspond to card communication unit 78 sending an interrogating electromagnetic signal when location unit 82 determines a relatively large distance between two subsequent geographical locations. In other examples, the user may be able to determine a specific distance value for the predetermined distance threshold between two subsequent geographical locations using user settings 86. Additionally, or alternatively, user settings 86 may include one or more settings in which the user can determine or adjust the frequency in which card communication unit 78 sends an interrogating electromagnetic signal when specific movements are detected by location unit 82. For example, user settings 86 may be used to configure card communication unit 78 such that is does not send an interrogating electromagnetic signal when location unit 82 determines that user computing device 14 is in a moving vehicle. In other examples, user settings 86 may include one or more settings in which the user can define a predetermined time interval in which card communication unit 78 periodically sends the interrogating electromagnetic signal. In some examples, additional or alternative settings may be able to be selected or adjusted using user settings 86.

Various combinations of user settings 86 may result in various amounts of power used by chip-enabled card unit 76. In some examples, a larger predetermined threshold distance, less sensitive security settings, a larger time interval between location unit 82 determining subsequent geographical locations, or combinations thereof may result in lower power usage by chip-enabled card unit 76. In some examples, user settings 86 includes one or more other settings relating to secure CNP transaction system 10 that are not specifically described herein.

Chip-enabled card unit 76 also includes registration unit 83 that enables the user to activate chip-enabled card 16 and/or register chip-enabled card 16 with card-issuing entity 30 such that chip-enabled card 16 is part of secure CNP transaction system 10, e.g., can be tracked by tracking server 26 and have CNP transaction requests using account information related to chip-enabled card 16 approved by authentication unit 28, as described herein. For example, registration unit 83 may enable the user to link chip-enabled card 16 to user computing device 14 such that chip-enabled card 16 is configured to send a response electromagnetic signal to user computing device 14, and user computing device 14 is configured to send an interrogating electromagnetic response to chip-enabled card 16. In addition, registration unit 83 may also enable the user to input or select a predetermined security and a predetermined answer to the predetermined security question, in accordance with the techniques of the disclosure. In some examples, registration unit 83 stores the predetermined security question and the predetermined answer to the predetermined security question in user settings 86. In this way, authentication server 28 may be able to access the predetermined answer to the predetermined security question in order to compare the received answer to the predetermined security question to the predetermined answer to determine whether to approve a CNP transaction request. Additionally, or alternatively, registration unit 83 may enable the user to activate chip-enabled card 16, e.g., so that chip-enabled card 16 is able to be used for transactions.

In some examples, registration unit 83 enables the user to select a specific user computing device 14 to generate datasets relating to chip-enabled card 16. For example, more than one computing device within the preset range of chip-enabled card 16 may be able to receive the response electromagnetic signal from chip-enabled card 16. In some examples, the user may want only one of the computing devices to generate datasets relating to chip-enabled card 16, such as, for example, if one or more of the other computing devices are not owned by the user. Registration unit 83 allows the user to select user computing device 14 to generate the datasets upon receiving the response electromagnetic signal such that any other computing devices within the preset range of chip-enabled card 16 disregard the response electromagnetic signal. In some examples, registration unit 83 enables the user to input the identifying information of chip-enabled card 16, e.g., the identifying information that is included in the response electromagnetic signals, and may store the identifying information in user settings 86. In turn, user computing device 14 may be configured to compare the identifying information received in the response electromagnetic signal to the identifying information stored in user settings 86, and may only generate a dataset if the identifying information of the response electromagnetic signal is substantially the same as the identifying information stored in user settings 86. In this way, user computing device 14 only generates datasets for chip-enabled card 16 and disregards response electromagnetic signals from other chip-enabled cards. Additionally, or alternatively, registration unit 83 may allow the user to link chip-enabled card 16 to the specific user computing device 14 through a phone number, subscriber identification module (SIM) card, or the like associated with user computing device 14. In turn, user computing device 14 may disregard response electromagnetic signals intercepted from chip-enabled cards not linked to the phone number, SIM card, or the like of user computing device 14.

Card communication unit 78 is configured to send an interrogating electromagnetic signal and receive a response electromagnetic signal from chip-enabled card 16. In some examples, the interrogating electromagnetic signal is a radio frequency (RF) signal. In other examples, the interrogating signal may be a different type of signal than a radio frequency signal. In examples in which the interrogating electromagnetic signal is a radio frequency signal, in some examples, card communication unit 78 may be configured to operate at a relatively high-frequency range (e.g., about 860 megahertz or about 960 megahertz). In other examples, card communication unit 78 may be configured to operate at a relatively low-frequency range (e.g., about 125 kilohertz and 134.3 kilohertz). In turn, the interrogating electromagnetic signal may have a preset range from user computing device 14, e.g., can reach a target within a preset distance from user computing device 14.

In some examples, such as in examples in which card communication unit 78 operates at a relatively high-frequency range, the preset range may be up to about 25 meters (about 90 feet) from user computing device 14, up to about 20 meters (about 60 feet) from user computing device 14, or up to about 10 meters (about 30 feet) from user computing device 14. In other examples, such as when card communication unit 78 is configured to operate at a relatively low-frequency range, the preset range may be less than about 0.3 meters (about 1 foot) from user computing device 14, such as, less than about 15 centimeters (about 0.5 feet) from user computing device 14, or less than about 5 centimeters (about 0.15 feet) from user computing device 14. In some examples, the preset range depends on chip-enabled card 16. For example, chip-enabled card 16 may include a single antenna, or chip-enabled card 16 may include more than one antenna, and the preset range may be based on the operation frequency of the one or more antennas of chip-enabled card 16. Examples of chip-enabled card 16 are described in more detail below with respect to FIGS. 5A and 5B.

In some examples, the response electromagnetic signal received by card communication unit 78 are encrypted in order to protect the identifying information or sensitive financial information of the user. In this way, card communication unit 78 may be configured to decrypt the response electromagnetic signals received from chip-enabled card 16.

If card communication unit 78 receives a response electromagnetic signal from chip-enabled card 16, card communication unit 78 determines that chip-enabled card 16 is within the preset range from user computing device 14. The response electromagnetic signal may include identifying information of chip-enabled card 16. For example, the identifying information may include a name of the owner of chip-enabled card 16, which may be same person as the user associated with user computing device 14. In other examples, the identifying information of chip-enabled card 16 may include additional or alternative information, such as a username, a telephone number, an email address, an identification number, or the like. In some examples, the identifying information does not include sensitive financial information relating to chip-enabled card 16, such as, for example, an account number, an expiration date, a security code, or the like associated with chip-enabled card 16. In this way, the sensitive financial information of the user may not be able to be intercepted by a bad actor, such as, when chip-enabled card 16 sends the response electromagnetic signal in a public place, and the bad actor has device capable of intercepting the response electromagnetic signal.

If card communication unit 78 does not receive a response electromagnetic signal from chip-enabled card 16, card communication unit 78 determines that chip-enabled card 16 is not within the preset range from user computing device 14. In some such examples, card communication unit 78 may wait to receive the response electromagnetic signal for a predetermined amount of time prior to determining that chip-enabled card 16 is not within the preset range of user computing device 14. In some examples, if card communication unit 78 determines that chip-enabled card 16 is not within the preset range of user computing device 14, card communication unit 78 alerts notification unit 84 that chip-enabled card 16 is not within range of user computing device 14.

Notification unit 84 is configured to present a notification indicating that chip-enabled card 16 is not within the preset range of user computing device 14. In some examples, the notification may be a push notification. In other examples, the notification may be a different type of notification. In some examples, the notification is presented via one or more UI devices 64. For example, the notification may include a visual notification on a display associated with user computing device 14, an audible notification on a speaker associated with user computing device 14, or both. In other examples, one or more additional or alternative UI devices 64 may be used to present the notification.

In addition to indicating that chip-enabled card 16 is not within the preset range of chip-enabled card 16, the notification may also allow the user to input a response to the notification using UI devices 64. For example, the notification may allow the user to select one or more functions, such as, to acknowledge the notification, contact card issuing entity 30, or report chip-enabled card 16 as lost or stolen. If the user selects the function to acknowledge the notification, user computing device 14 may disable subsequent notifications indicating that chip-enabled card 16 is not within the preset range from user computing device 14. In some examples, the notifications may be disabled for a predetermined amount of time. If the user selects the function to contact card issuing entity 30, user computing device 14 may automatically communicate with tracking server 26, e.g., report unit 44 of tracking server 26 from FIG. 2, in order to connect user computing device 14 with card issuing entity 30 using a secure voice or data communication channel, which may allow the user to report chip-enabled card 16 as lost or stolen, cancel chip-enabled card 16, prevent transactions from occurring using chip-enabled card 16, or the like by communicating with a representative of card issuing entity 30 over the secure communication channel. If the user selects to report chip-enabled card 16 as lost or stolen, user computing device 14 may automatically send a notification indicating the user's selection to a server associated with card-issuing entity 30, e.g., report unit 44 of tracking server 26, to lock or cancel chip-enabled card 16 such that it cannot be used for transactions, issue a new chip-enabled card to the user, monitor the account of the user linked to chip-enabled card 16, or the like. In some examples, user settings 86 allows the user to select what action is taken in the event the user reports chip-enabled card 16 as lost or stolen.

In some examples, card communication unit 78 may determine if chip-enabled card 16 is within the preset range of user computing device 14 either continuously or periodically. For example, as described above, card communication unit 78 may be configured to send the interrogating electromagnetic signal based on movement of user computing device 14, such as based on a distance between two subsequent geographical locations of user computing device 14 or based on a specific movement of user computing device 14. In some such examples, card communication unit 78 is continuously determining if chip-enabled card 16 is within the preset range of user computing device 14 based on movement of user computing device. In other examples, card communication unit 78 may be configured to send the interrogating electromagnetic signal and determine if chip-enabled card 16 is within the preset range of user computing device 14 periodically based on a predetermined time interval.

Regardless of whether chip-enabled card 16 is determined to be within the preset range of user computing device 14, dataset unit 80 is configured to generate a dataset and send the dataset to a server associated with card issuing entity 30, e.g., tracking server 26. In some examples, dataset unit 80 receives information from card communication unit 78 and location unit 82 to generate the dataset. For example, dataset unit 80 may receive information from card communication unit 78 that indicates whether chip-enabled card 16 is within the preset range of user computing device 14, and may receive information from location unit 82 including the geographical location of user computing device 14. Dataset unit 80 generates a dataset including a time stamp, e.g., based on a clock of user computing device 14, and the geographical location of user computing device 14 from location unit 82. In some examples, such as when chip-enabled card 16 is within the preset range of user computing device 14, the dataset generated by dataset unit 80 further includes the identifying information of chip-enabled card 16 from card communication unit 78. The inclusion of the identifying information of chip-enabled card 16 in the data set may indicate that the geographic location of chip-enabled card 16 is substantially the same as the geographical location of user computing device 14. In other examples, such as when the response electromagnetic signal from chip-enabled card 16 is not received by card communication unit 78, the dataset generated by dataset unit 80 may only include the geographical location of user computing device 14 and the time stamp. After dataset unit 80 generates the dataset, dataset unit 80 sends the dataset to a server associated with card-issuing entity 30, e.g., tracking server 26.

In some examples, card communication unit 78 may receive a response electromagnetic signal from more than one chip-enabled card. For example, card communication unit 78 may receive response electromagnetic signals from more than one chip-enabled card that is within the preset range of user computing device 14. Card communication unit 78 may use the identifying information of each chip-enabled card included in each response electromagnetic signal to determine which identifying information corresponds to the paired or linked chip-enabled card 16 associated with user computing device 14. For example, card communication unit 78 may only send the identifying information of chip-enabled card 16 to dataset unit 80 to generate the dataset, and may disregard the response electromagnetic signals received including identifying information of cards other than chip-enabled card 16. Additionally, or alternatively, card communication unit 78 may disregard response electromagnetic signals not linked to a phone number, SIM card, or the like of user computing device 14. In this way, only datasets relating to chip-enabled card 16 are generated and sent to tracking server 26 by dataset unit 80.

Figure 5A:
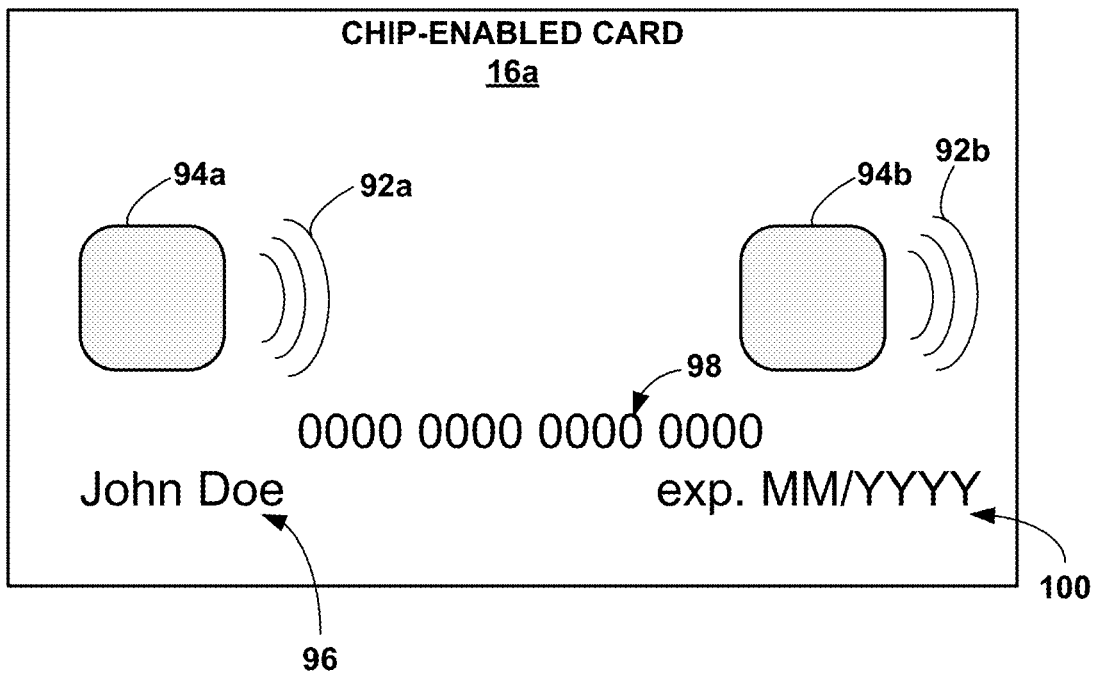
FIG. 5A is a conceptual and schematic diagram illustrating an example chip-enabled card including a short-range antenna and a long-range antenna, in accordance with the techniques of this disclosure.

FIG. 5A is a conceptual and schematic diagram illustrating an example chip-enabled card 16a including a short-range antenna 92a and a long-range antenna 92b, in accordance with the techniques of this disclosure. In some examples, chip-enabled card 16a may be similar to the chip-enabled card described in U.S. Provisional Application No. 62/591,606, the entirety of which is incorporated herein by reference. In other examples, chip-enabled card 16a may be configured in a variety of ways, in accordance with the techniques of the disclosure.

Chip-enabled card 16a may be a credit card or a debit card. Though chip-enabled card 16a is depicted with two integrated circuits (ICs) 94a and 94b (collectively referred to herein as, "ICs 94"), in other examples chip-enabled card 16a may have one IC (FIG. 5B) or three or more ICs. ICs 94 may include a memory to store identifying information of chip-enabled card 16a, account information linked to chip-enabled card 16a, or other information related to chip-enabled card 16a. ICs 94 may further include other circuitry components understood by one of ordinary skill in the art to be used to execute the techniques described herein. In addition to short-range antenna 92a and long-range antenna 92b as described herein, chip-enabled card 16a may further include a magnetic strip for swiping in a conventional card reader and/or ICs 94 may be configured to be readable by a conventional chip reader (e.g., as a result of inserting chip-enabled card 16a into a "dip" card reader).

In some examples, IC 94a is configured to store sensitive financial information of the user, such as account information linked to chip-enabled card 16a, for use during "card present" transactions with a merchant's point-of-sale (POS) device, e.g., an RFID reader or a "dip" card reader. IC 94b is configured to store identifying information of the user of chip-enabled card 16a. For example, IC 94b may store the identifying information of chip-enabled card 16a that is included in a response electromagnetic signal sent to user computing device 14. The identifying information stored on IC 94b may include information related to an owner of chip-enabled card 16a, such as a name, username, telephone number, email address, identification number (e.g., driver's license number, student identification number, work identification number), or the like. In this way, the identifying information stored on IC 94b may not include sensitive financial information of the user.

In the example shown in FIG. 5A, each of IC 94a and 94b is coupled to a different antenna 92a and 92b, respectively. For example, IC 94a is coupled to short-range antenna 92a, and IC 94b is coupled to long-range antenna 92b. In this way, IC 94a may be configured to send an electromagnetic signal including sensitive financial information of the user, e.g., to complete transactions, via short-range antenna 92a to the RFID reader of a POS device by placing or "swiping" chip-enabled card 16a near the POS device. In other examples, IC 94a may be electrically coupled to two short-range antennas by a switch (not shown) such that only a portion of the sensitive financial information may be sent via each antenna to the POS device at a time. The dual short-range antenna example causes the user to perform a double swipe with chip-enabled card in order to perform a card present transaction. An example of a chip-enabled card including the dual short-range antennas is described in U.S. Provisional Application No. 62/591,592, the entirety of which is incorporated herein by reference.

IC 94b, on the other hand, may be configured to send an electromagnetic signal including the identifying information of chip-enabled card 16a, via long-range antenna 92b, e.g., to user computing device 14 as a response electromagnetic signal. In turn, a bad actor may be less likely to intercept the sensitive financial information of the user since long-range antenna 92b is not configured to send such sensitive financial information.

In some examples, both short-range antenna 92a and long-range antenna 92b are radio frequency (RF) antennas, such that chip-enabled card 16a is a radio frequency identification (RFID) card. As such, chip-enabled card 16a may be powered to send signals by the electromagnetic fields created by interrogating electromagnetic signals that are received by long-range antenna 92b and used by chip-enabled card 16a to send a response electromagnetic signal using long-range antenna 92b.

Long-range antenna 92b is configured to have a relatively greater range than short-range antenna 92a. For example, short-range antenna 92a may be configured to operate at a relatively low-frequency range (e.g., 125 kilohertz or 134.3 kilohertz) and may have an operational range of less than about 15 centimeters (about 0.5 feet) from a source or destination, while long-range antenna 92b may be configured to operate at a relatively high-frequency range (e.g., 860 megahertz or 960 megahertz) and may have an operational range of up to about 25 meters (about 90 feet) from a source or destination. In other examples, short-range antenna 92a and/or long-range antenna 92b may have other operational ranges.

In the illustrated example of FIG. 5A, chip-enabled card 16a also includes a user's name 96, an account number 98 associated with chip-enabled card 16a, and an expiration date 100 printed or embossed on the physical card. In addition, although not shown in FIG. 5A, chip-enabled card 16a may include a card security code (CSC) (alternatively referred to as a card verification value (CVV) or card verification code (CVC)) printed or embossed on a back of the physical card. In some cases, chip-enabled card 16a may also include a magnetic stripe and a region for a user's signature attached on the back of the physical card.

Figure 5B:
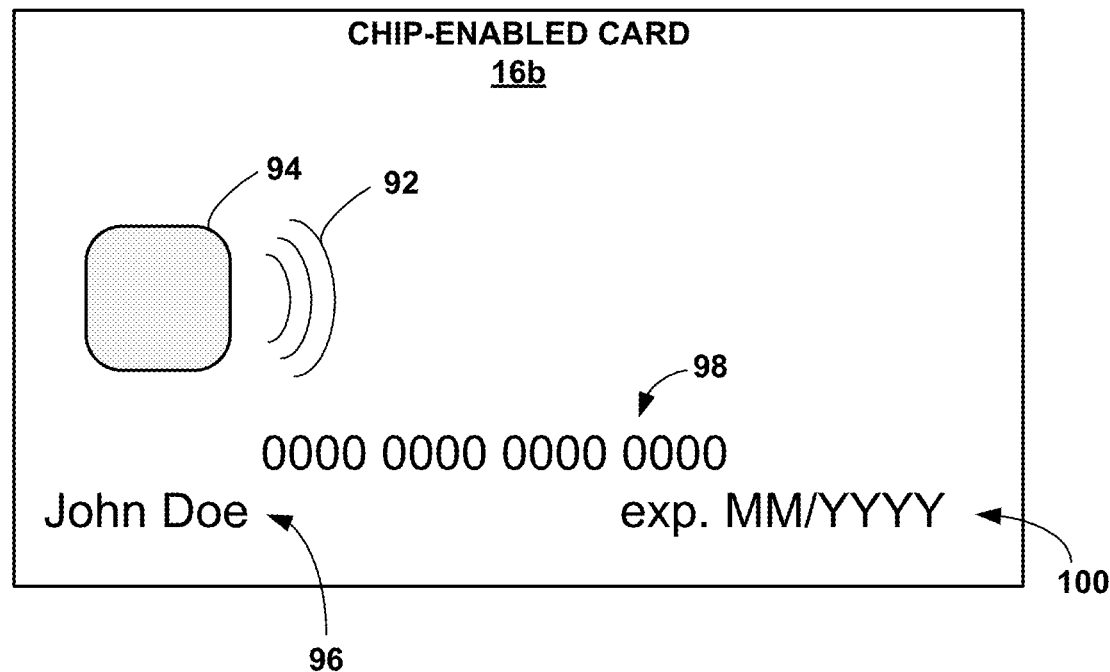
FIG. 5B is a conceptual and schematic diagram illustrating an example chip-enabled card including only a single antenna, in accordance with the techniques of this disclosure.

FIG. 5B is a conceptual and schematic diagram illustrating an example chip-enabled card 16b including only a single antenna 92, in accordance with the techniques of this disclosure. Chip-enabled card 16b may be substantially similar to chip-enabled card 16a. For example, chip-enabled card 16b may include a user's name 96, the account number 98 associated with chip-enabled card 16a, and an expiration date 100 printed or embossed on the physical card. In comparison to chip-enabled card 16a, however, chip-enabled card 16b includes a single IC 94 and a single antenna 92.

The single IC 94 of chip-enabled card 16b may include identifying information of chip-enabled card 16b and sensitive financial information of the user of chip-enabled card 16b. IC 94 is coupled to antenna 92, which may be a short-range antenna (e.g., short-range antenna 92a of FIG. 5A) or a long-range antenna (e.g., long-range antenna 92b of FIG. 5A). In some examples, antenna 92 that is a short-range antenna may be more secure than antenna 92 that is a long-range antenna. For example, antenna 92 may send electromagnetic signals including both the identifying information of chip-enabled card 16b and the sensitive financial information of the user, and in some examples, the electromagnetic signals may be more easily intercepted by a bad actor in examples in which antenna 92 is a long-range antenna (e.g., the bad actor may be able to intercept the electromagnetic signals from a further distance from chip-enabled card 16b than if antenna 92 is a short-range antenna). Antenna 92 that is a short-range antenna may have a smaller preset range from user computing device 14 in which antenna can send and receive electromagnetic signals. In some examples, chip-enabled card 16 is within the preset range of user computing device 14 more often than not, such as, for example, if the user utilizes a wallet-type case or holder for user computing device 14 that holds chip-enabled card 16 near user computing device 14 or if the user generally keeps both user computing device 14 and chip-enabled card in his or her pocket. In some such examples, the shorter preset range of antenna 92 that is a short-range antenna may be secure and able to accurately track chip-enabled card 16, even if the sensitive financial information of the user is sent in the response electromagnetic signal. In other examples, antenna 92 may include two short-range antennas that are coupled to IC 94 by a switch (not shown) such that the user's sensitive financial information may not be sent to user computing device 14 in the response electromagnetic signal. In this way, the dual short-range antennas may operate similar to the example that includes both a long-range antenna and a short-range antenna (FIG. 5A) in that the response electromagnetic signal may only include identifying information of the user.

Figure 6:
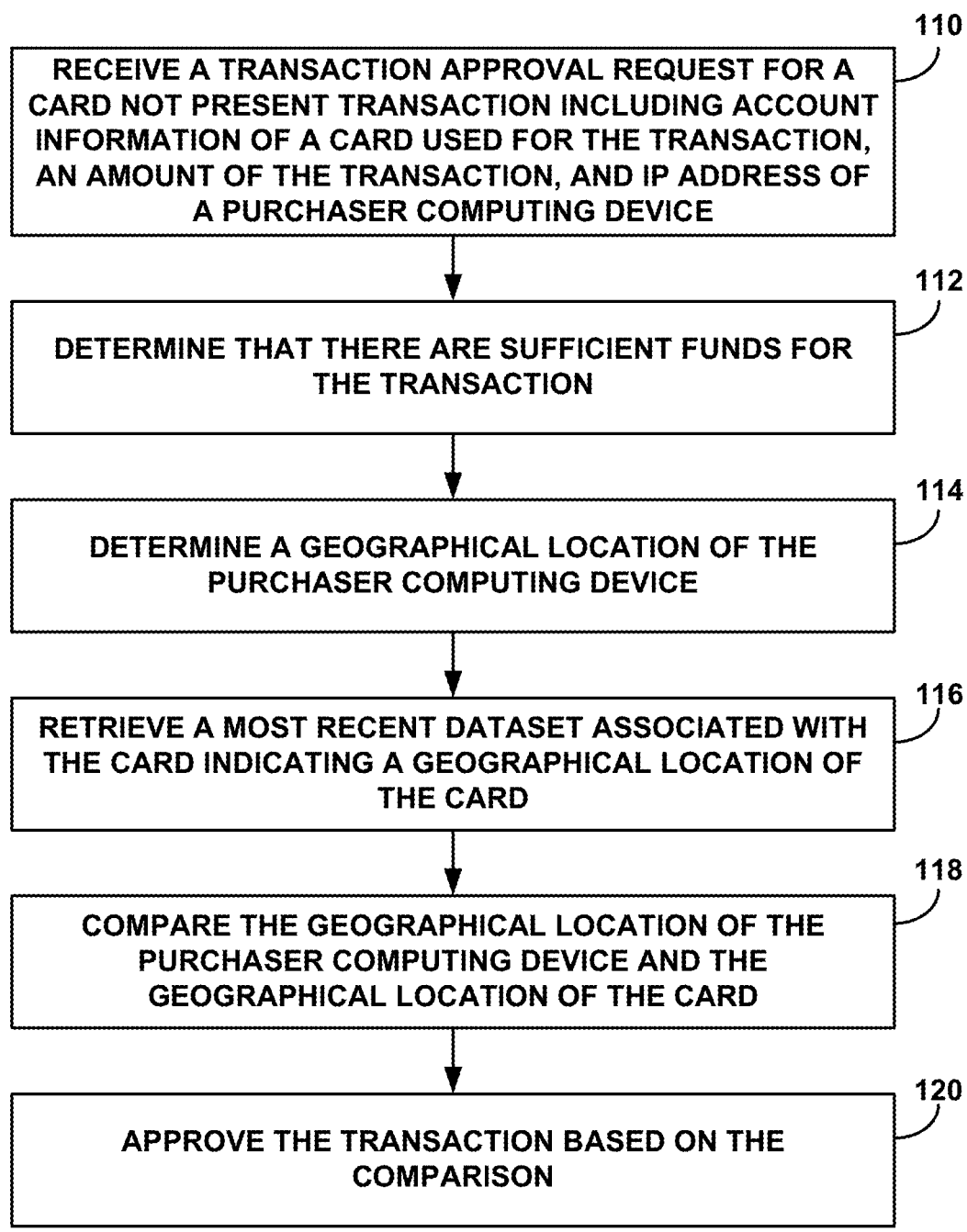
FIG. 6 is a flowchart illustrating an example operation of a CNP transaction approval process by a transaction server, in accordance with the techniques of this disclosure.

FIG. 6 is a flowchart illustrating an example operation of a CNP transaction approval process by a transaction server, in accordance with the techniques of this disclosure. The example technique of FIG. 6 will be described with respect to transaction server 24 of FIG. 1.

The technique of FIG. 6 includes receiving, by authentication server 28 and from purchaser computing device 22, a transaction approval request for a CNP transaction, the transaction approval request including account information of chip-enabled card 16 used for the transaction, an amount of the transaction, and an Internet Protocol (IP) address of purchaser computing device 22 (110). Authentication server 28 can then determine, based on the account information of chip-enabled card 16 and the amount of the transaction, that there are sufficient funds for the transaction (112). For example, authentication server 28 may determine if the account linked to chip-enabled card 16 has a sufficient amount of credit available for the amount of the CNP transaction, e.g., an amount of credit greater than or equal to the amount of the CNP transaction, or authentication server 28 may determine if a checking or savings account linked to chip-enabled card 16 has a sufficient amount of funds available for the amount of the CNP transaction, e.g., an amount of funds greater than or equal to the amount of the CNP transaction.

The technique of FIG. 6 further includes determining, based on the IP address of purchaser computing device 22, a geographical location of purchaser computing device 22 (114). In some examples, authentication server 28 may determine the geographical location of purchaser computing device 22 based on the IP address utilizing information registered in a database, geographic codes in the IP address, network routing and/or timing information, or the like. Additionally, or alternatively, authentication server 28 may use a geolocation determination service, such as, for example, IP2Location™, ininfo.io, IP-GeoLoc™ Address Geolocation Online Service, DB-IP Database, Skyhook Precision Location, or GeoIP® Databases and Services.

Authentication server 28 then retrieves, from a log (e.g., dataset log 42 of tracking server 26 from FIG. 2), a most recent dataset associated with chip-enabled card 16, the most recent dataset indicating a geographical location of chip-enabled card 16 (116). In some examples, the most recent dataset may indicate that the geographical location of chip-enabled card 16 is the geographical location of user computing device 14. In other examples, the most recent dataset may indicate that the geographical location of chip-enabled card 16 is unknown.

The technique of FIG. 6 also includes comparing the geographical location of purchaser computing device 22 and the geographical location of chip-enabled card 16 (118). For example, authentication server 28 may determine if the geographical location of purchaser computing device 22 is substantially the same or different from the geographical location of chip-enabled card 16. In some examples, authentication server 28 may determine that the geographical location of purchaser computing device 22 is substantially the same as the geographical location of chip-enabled card 16 if the geographical location of purchaser computing device 22 is within a predetermined threshold distance of the geographical location of chip-enabled card 16. The geographical location of purchaser computing device 22 being substantially the same as the geographical location of chip-enabled card 16 may indicate that it is unlikely a bad actor is attempting to perform the CNP transaction from purchaser computing device 22.

In some examples, authentication server 28 may compare the geographical locations of purchaser computing device 22 and chip-enabled card 16 only in examples in which the geographical location of chip-enabled card 16 is indicated as the geographical location of user computing device 14 in the most recent dataset. For example, authentication server 28 may not compare the geographical locations if the geographical location of chip-enabled card 16 is indicated as unknown in the most recent dataset. In other examples, authentication server 28 may compare the geographical locations of purchaser computing device 22 and chip-enabled card 16 even if the geographical location of chip-enabled card 16 is indicated as unknown. In some such examples, authentication server 28 may automatically determine that the geographical locations of purchaser computing device 22 and chip-enabled card 16 are different.

Authentication server 28 approves the transaction approval request based on the comparison (120). For example, if the geographical location of purchaser computing device 22 is substantially the same as the geographical location of chip-enabled card 16, authentication server 28 may approve the CNP transaction requested by purchaser computing device 22.

In some examples, the geographical location of purchaser computing device 22 is different than the geographical location of chip-enabled card 16. In some such examples, a bad actor may be attempting to perform the CNP transaction on purchaser computing device 22. In other examples, however, the geographical location of purchaser computing device 22 is different than the geographical location of chip-enabled card 16 but the CNP transaction may not be fraudulent. In order to protect against fraudulent transactions but to prevent authentication server 28 from denying a legitimate CNP transaction even though the CNP transaction was requested by purchaser computing device 22 with a different geographical location than chip-enabled card 16, the technique of FIG. 6 may additionally include sending, to purchaser computing device 22, a predetermined security question.

After sending the predetermined security question to purchaser computing device 22, authentication server 28 may receive, from purchaser computing device 22, an answer to the predetermined security question. Authentication server 28 compares the received answer to a predetermined answer to the predetermined security question, and approves the transaction approval request based on the comparison. For example, if the received answer is the same as the predetermined answer to the security question, authentication server 28 may approve the CNP transaction requested by purchaser computing device 22. If the received answer is not the same as the predetermined answer to the security question, may deny the CNP transaction requested by purchaser computing device 22.

Figure 7:
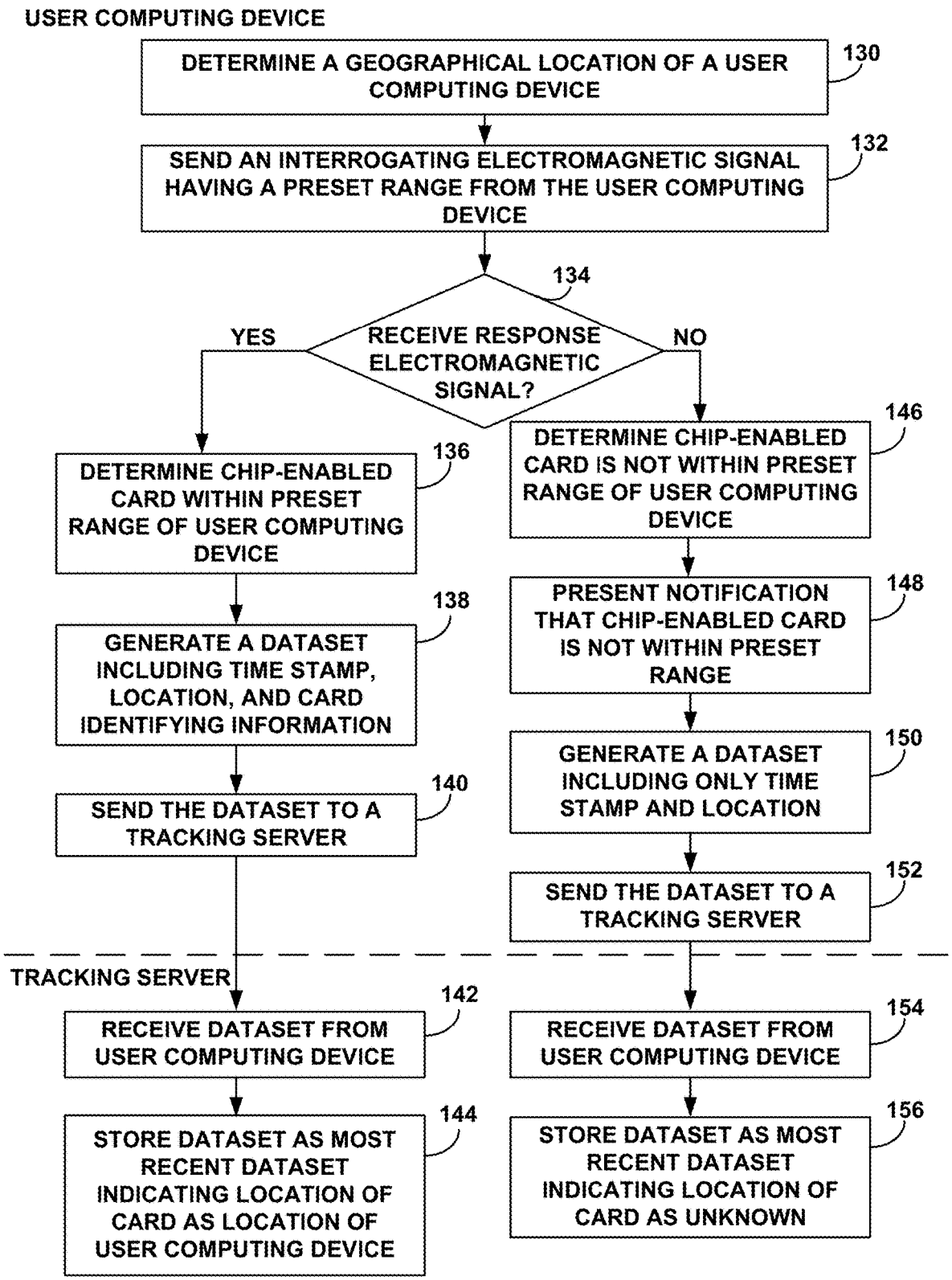
FIG. 7 is a flowchart illustrating an example operation of creating and storing datasets performed by a user computing device and a tracking server, in accordance with the techniques of this disclosure.

FIG. 7 is a flowchart illustrating an example operation of creating and storing datasets performed by a user computing device and a tracking server, in accordance with the techniques of this disclosure. The example technique of FIG. 7 will be described with respect to secure CNP transaction system 10 of FIG. 1.

The technique of FIG. 7 includes determining a geographical location of user computing device 14 (130). In some examples, the geographical location of user computing device 14 may be determined using Global Positioning System (GPS) data, Global System for Mobile communication (GSM) Cell Identification (ID) data, Wi-Fi data, data from one or more inertial sensors of user computing device 14, data from one or more barometric sensors of user computing device 14, data from RF, Bluetooth® and/or NFC signals, or the like.

The technique of FIG. 7 further includes sending, from user computing device 14, an interrogating electromagnetic signal having a preset range from user computing device 14 (132). In some examples, the interrogating electromagnetic signal is a radio frequency (RF) signal. In other examples, the interrogating signal may be a different type of signal than a radio frequency signal. User computing device 14 may be configured to operate at a relatively high-frequency range (e.g., about 860 megahertz or about 960 megahertz), or at a relatively low-frequency range (e.g., about 125 kilohertz and 134.3 kilohertz). In turn, the interrogating electromagnetic signal may have a preset range from user computing device 14, e.g., can reach a target within a preset distance from user computing device 14. The preset range may be up to about 25 meters (about 90 feet) from user computing device 14, or may be less than about 0.3 meters (about 1 foot) from user computing device 14, depending on the operating frequency of user computing device 14 and/or of chip-enabled card 16.

In some examples, user computing device 14 receives a response electromagnetic signal from chip-enabled card 16 (YES branch of 134). The response electromagnetic signal may include identifying information from chip-enabled card 16, such as a name of the owner of chip-enabled card 16, which may be same person as the user associated with user computing device 14, a username, a telephone number, an email address, an identification number, or the like. In examples in which user computing device 14 receives the response electromagnetic signal from chip-enabled card 16 (YES branch of 134), user computing device 14 may determine, based on the receipt of the response electromagnetic signal from chip-enabled card 16 including the identifying information of chip-enabled card 16, that chip-enabled card 16 is within the preset range from user computing device 14 (136).

After determining that chip-enabled card 16 is within the preset range of user computing device 14 (136), the technique of FIG. 7 further includes generating a dataset including a time stamp, the geographical location of user computing device 14, and the identifying information of chip-enabled card 16 (138) and sending, from user computing device 14 to a server device associated with card-issuing entity 30 of chip-enabled card 16, e.g., tracking server 26, the dataset (140).

The technique of FIG. 7 includes tracking server 26 receiving, from user computing device 14, the dataset associated with chip-enabled card 16 (142). The dataset includes the time stamp, the geographical location of user computing device 14, and the identifying information of chip-enabled card 16. The inclusion of the identifying information of chip-enabled card 16 indicates that chip-enabled card 16 is within the preset range from user computing device 14. In some examples, as described above, tracking server 26 receives the dataset associated chip-enabled card 16 from user computing device 14 either continuously based on movement of user computing device 14, or periodically based on a predetermined time interval.

Tracking server 26 then stores the dataset as the most recent dataset in a log, e.g., dataset log 42 from FIG. 2 (144). Since the dataset includes the identifying information of the chip-enabled card 16, indicating that chip-enabled card 16 is within the preset range, the most recent dataset stored by tracking server 26 indicates the geographical location of chip-enabled card 16 as the geographical location of user computing device 14.

In other examples, user computing device 14 does not receive a response electromagnetic signal from chip-enabled card 16 (NO branch of 134). In some examples, user computing device 14 may wait to receive the response electromagnetic signal for a predetermined amount of time. In examples in which user computing device 14 does not receive the response electromagnetic signal from chip-enabled card 16 (NO branch of 134), user computing device 14 may determine, based on not receiving the response electromagnetic signal after a predetermined amount of time, that chip-enabled card 16 is not within the preset range from the user computing device (146).

After determining that chip-enabled card 16 is not within the preset range of user computing device 14 (146), the technique of FIG. 7 further includes presenting a notification, via a display of user computing device 14, indicating that chip-enabled card 16 is not within the preset range of user computing device 14 (148). In some examples, user computing device 14 may additionally receive a response to the notification, e.g., input from the user via user computing device 14, that may result in user computing device 14 taking an additional action, such as establishing a secure communication line with card-issuing entity 30 via tracking server 26. After presenting the notification, user computing device 14 generates a dataset including a time stamp and the geographical location of user computing device 14 (150) and sends, to a server device associated with card-issuing entity 30 of chip-enabled card 16, e.g., tracking server 26, the dataset (152).

The technique of FIG. 7 includes tracking server 26 receiving, from user computing device 14, the dataset associated with chip-enabled card 16 (154). The dataset includes the time stamp and the geographical location of user computing device 14, but does not include the identifying information of chip-enabled card 16 because user computing device 14 did not receive the response electromagnetic signal from chip-enabled card 16. The dataset not including the identifying information of chip-enabled card 16 indicates that chip-enabled card 16 is not within the preset range from user computing device 14. In some examples, as described above, tracking server 26 receives the dataset associated chip-enabled card 16 from user computing device 14 either continuously based on movement of user computing device 14, or periodically based on a predetermined time interval. Tracking server 26 stores the dataset as the most recent dataset in a log, e.g., dataset log 42 from FIG. 2 (156). Tracking server 26 indicates that the geographical location of chip-enabled card 16 is unknown because the dataset does not include the identifying information of chip-enabled card 16, indicating that chip-enabled card is not within the preset range of user computing device 14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the techniques described herein may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A server device comprising:
a memory configured to store a plurality of datasets; and
one or more processors in communication with the memory and configured to:
receive, from a purchaser computing device, a transaction approval request for a card not present transaction, the transaction approval request including account information of a chip-enabled card used for the transaction, an amount of the transaction, and an Internet Protocol (IP) address of the purchaser computing device;
determine, based on the account information of the chip-enabled card and the amount of the transaction, that there are sufficient funds for the transaction;
determine, based on the IP address of the purchaser computing device, a geographical location of the purchaser computing device;
retrieve, from a log, a most recent dataset associated with the chip-enabled card, the most recent dataset indicating a geographical location of the chip-enabled card;

compare the geographical location of the purchaser computing device and the geographical location of the chip-enabled card; and approve the transaction approval request based on the comparison.

2. The server device of claim 1, wherein the one or more processors are configured to:

receive, from a user computing device, a dataset associated with the chip-enabled card, the dataset including a time stamp, a geographical location of the user computing device, and identifying information of the chip-enabled card, which indicates that the chip-enabled card is within a preset range from the user computing device; and store the dataset as the most recent dataset in the log, wherein the most recent dataset indicates the geographical location of the chip-enabled card as the geographical location of the user computing device.

3. The server device of claim 2, wherein the one or more processors are configured to receive datasets associated with the chip-enabled card from the user computing device either continuously based on movement of the computing device or periodically based on a predetermined time interval.

4. The server device of claim 1, wherein the one or more processors are configured to:

receive, from a user computing device, a dataset associated with the chip-enabled card, the dataset including only a time stamp and a geographical location of the user computing device, which indicates that the chip-enabled card is not within a preset range from the user computing device; and store the dataset as the most recent dataset in the log, wherein the most recent dataset indicates the geographical location of the chip-enabled card as being unknown.

5. The server device of claim 1, wherein the one or more processors are configured to:

based on the comparison, determine that the geographical location of the purchaser computing device is different than the geographical location of the chip-enabled card;

send, to the purchaser computing device, a predetermined security question; and receive, from the purchaser computing device, an answer to the predetermined security question.

6. The server device of claim 5, wherein, to approve the transaction approval request, the one or more processors are configured to:

compare the received answer to a predetermined answer to the predetermined security question; and approve the transaction approval request based on the comparison.

7. The server device of claim 1, wherein, to approve the transaction approval request, the one or more processors are configured to, based on the comparison, determine that the geographical location of the purchaser computing device is substantially the same as the geographical location of the chip-enabled card, and approve the transaction approval request.

8. A computer-implemented method comprising:

receiving, by a server device and from a purchaser computing device, a transaction approval request for a card not present transaction, the transaction approval request including account information of a chip-enabled card used for the transaction, an amount of the transaction, and an Internet Protocol (IP) address of the purchaser computing device;

determining, based on the account information of the chip-enabled card and the amount of the transaction, that there are sufficient funds for the transaction;

determining, based on the IP address of the purchaser computing device, a geographical location of the purchaser computing device;

retrieving, from a log, a most recent dataset associated with the chip-enabled card, the most recent dataset indicating a geographical location of the chip-enabled card;

comparing the geographical location of the purchaser computing device and the geographical location of the chip-enabled card; and approving the transaction approval request based on the comparison.

9. The computer-implemented method of claim 8, further comprising:

receiving, from a user computing device, a dataset associated with the chip-enabled card, the dataset including a time stamp, a geographical location of the user computing device, and identifying information of the chip-enabled card, which indicates that the chip-enabled card is within a preset range from the user computing device; and storing the dataset as the most recent dataset in the log, wherein the most recent dataset indicates the geographical location of the chip-enabled card as the geographical location of the user computing device.

10. The computer-implemented method of claim 9, wherein receiving the dataset associated with the chip-enabled card comprises receiving the dataset associated with the chip-enabled card from the user computing device either continuously based on movement of the user computing device or periodically based on a predetermined time interval.

11. The computer-implemented method of claim 8, further comprising:

receiving, from a user computing device, a dataset associated with the chip-enabled card, the dataset including only a time stamp and a geographical location of the user computing device, which indicates that the chip-enabled card is not within a preset range from the user computing device; and storing the dataset as the most recent dataset in the log, wherein the most recent dataset indicates the geographical location of the chip-enabled card as being unknown.

12. The computer-implemented method of claim 8, further comprising:

based on the comparison, determining that the geographical location of the purchaser computing device and the geographical location of the chip-enabled card are different;

sending, to the purchaser computing device, a predetermined security question; and receiving, from the purchaser computing device, an answer to the predetermined security question.

13. The computer-implemented method of claim 12, wherein approving the transaction approval request comprises:

comparing the received answer to a predetermined answer to the predetermined security question; and approving the transaction approval request based on the comparison.

14. The computer-implemented method of claim 8, wherein approving the transaction approval request comprises determining that the geographical location of the purchaser computing device and the geographical location of the chip-enabled card are substantially the same, and approving the transaction approval request.

\* \* \* \* \*